（12） United States Patent
Matsuura et al.

(10) Patent No.: US 10,531,028 B2
(45) Date of Patent: Jan. 7, 2020

(54) SOLID-STATE IMAGING DEVICE, METHOD OF DRIVING SOLID-STATE IMAGING DEVICE, AND ELECTRONIC DEVICE

(71) Applicant: Sony Semiconductor Solutions Corporation, Kanagawa (JP)

(72) Inventors: Kouji Matsuura, Kanagawa (JP); Noam Eshel, Ra anana (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 32 days.

(21) Appl. No.: 15/751,980

(22) PCT Filed: Aug. 5, 2016

(86) PCT No.: PCT/JP2016/073038
§ 371 (c)(1),
(2) Date: Feb. 12, 2018

(87) PCT Pub. No.: WO2017/030007
PCT Pub. Date: Feb. 23, 2017

(65) Prior Publication Data
US 2018/0234649 A1 Aug. 16, 2018

(30) Foreign Application Priority Data
Aug. 20, 2015 (JP) ................................. 2015-162429

(51) Int. Cl.
H04N 5/365 (2011.01)
H04N 5/378 (2011.01)
(Continued)

(52) U.S. Cl.
CPC ............. H04N 5/365 (2013.01); H04N 5/357 (2013.01); H04N 5/3575 (2013.01);
(Continued)

(58) Field of Classification Search
CPC .... H04N 5/365; H04N 5/3698; H04N 5/3575; H04N 5/3745; H04N 5/378; H04N 5/357
See application file for complete search history.

(56) References Cited

U.S. PATENT DOCUMENTS 6,344,877 B1 * 2/2002 Gowda ................ H04N 5/3575
250/208.1
6,654,054 B1 * 11/2003 Embler ................ H04N 5/3577
348/241

(Continued)

FOREIGN PATENT DOCUMENTS

JP 2007-159115 A 6/2007
JP 2007-281540 A 10/2007
JP 2010-251914 A 11/2010

OTHER PUBLICATIONS

International Search Report and English translation thereof dated Oct. 25, 2016 in connection with International Application No. PCT/JP2016/073038.

(Continued)

Primary Examiner — Abdelaaziz Tissire
(74) Attorney, Agent, or Firm — Wolf, Greenfield & Sacks, P.C.

(57) ABSTRACT

The present technology is concerned with a solid-state imaging device, a method of driving a solid-state imaging device, and an electronic device which are capable of reducing power supply noise of a pixel signal with a single-ended circuit arrangement.

The solid-state imaging device includes a pixel section including a plurality of unit pixels disposed for photoelectric transduction, a power supply noise detector detecting a noise component from a power supply used to energize the unit pixels and outputting a single-ended canceling signal including a canceling component for canceling the noise component, a sample and hold section configured to sample single-ended pixel signals output from the unit pixels and hold and output pixel signals representing the sampled pixel signals from which the noise component has been removed on the basis of the canceling signal, and an A/D converter perform- (Continued)

ing A/D conversion on the pixel signals that have been held. The present technology is applicable to a CMOS image sensor, for example.

10 Claims, 15 Drawing Sheets

(51) Int. Cl.
*H04N 5/357* (2011.01)
*H04N 5/3745* (2011.01)
*H04N 5/369* (2011.01)

(52) U.S. Cl.
CPC ........... *H04N 5/3698* (2013.01); *H04N 5/378* (2013.01); *H04N 5/3745* (2013.01)

(56) References Cited

U.S. PATENT DOCUMENTS

| | | | |
|---|---|---|---|
| 2005/0088549 A1* | 4/2005 | Hatano | H04N 5/217 348/241 |
| 2005/0212528 A1* | 9/2005 | Kajita | G01R 29/26 324/613 |
| 2007/0132868 A1 | 6/2007 | Lee et al. | |
| 2008/0111905 A1 | 5/2008 | Toyama et al. | |
| 2008/0283876 A1* | 11/2008 | Souda | G01R 29/26 257/254 |
| 2010/0259430 A1* | 10/2010 | Okamoto | H01L 27/14609 341/122 |
| 2016/0309099 A1* | 10/2016 | Yeh | H04N 5/378 |
| 2019/0068902 A1* | 2/2019 | Nishino | H04N 5/3577 |

OTHER PUBLICATIONS

International Written Opinion and English translation thereof dated Oct. 25, 2016, in connection with International Application No. PCT/JP2016/073038.
International Preliminary Report on Patentability and English translation thereof dated Mar. 1, 2018, in connection with International Application No. PCT/JP2016/073038.

* cited by examiner

F I G. 5
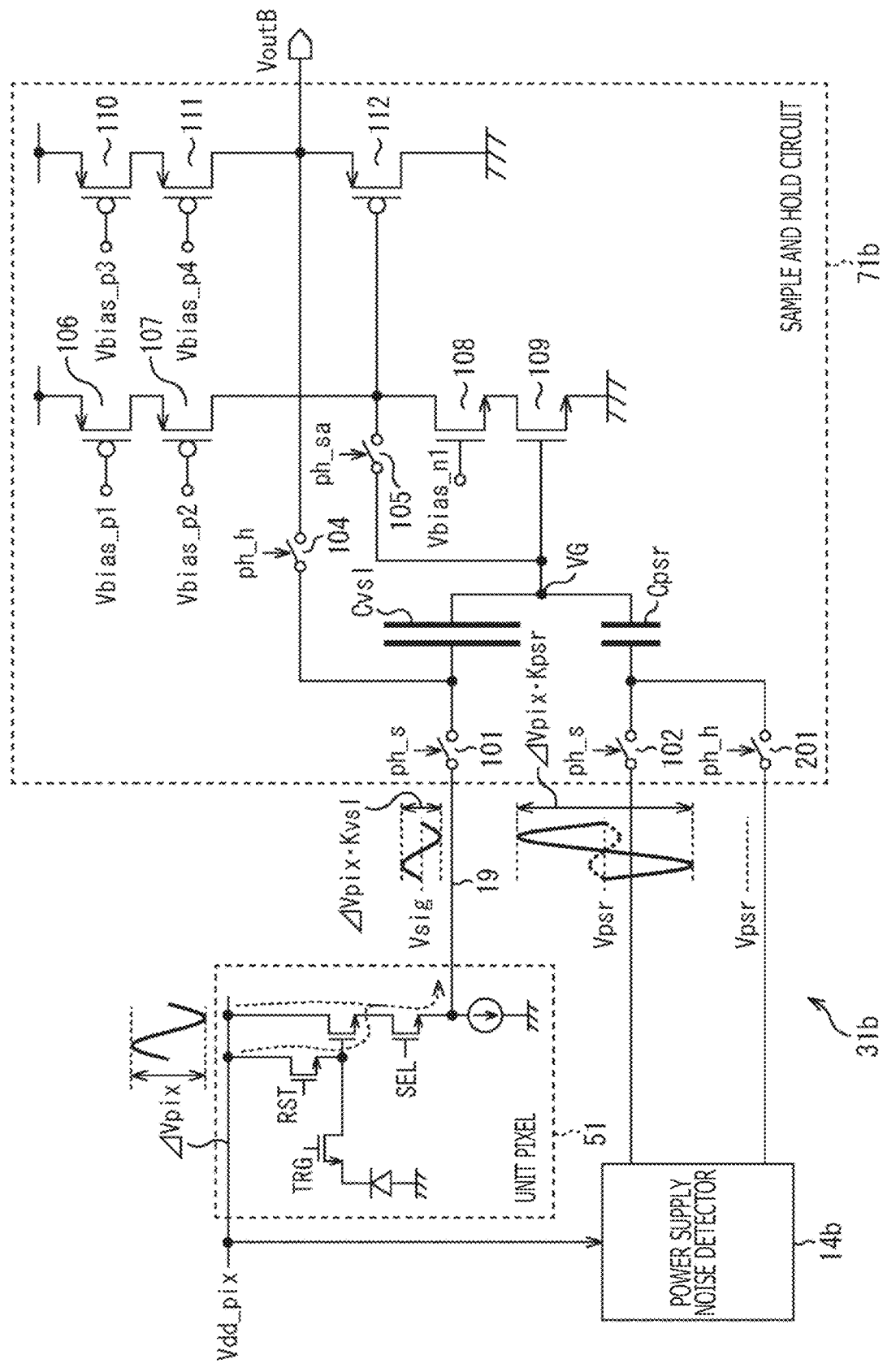

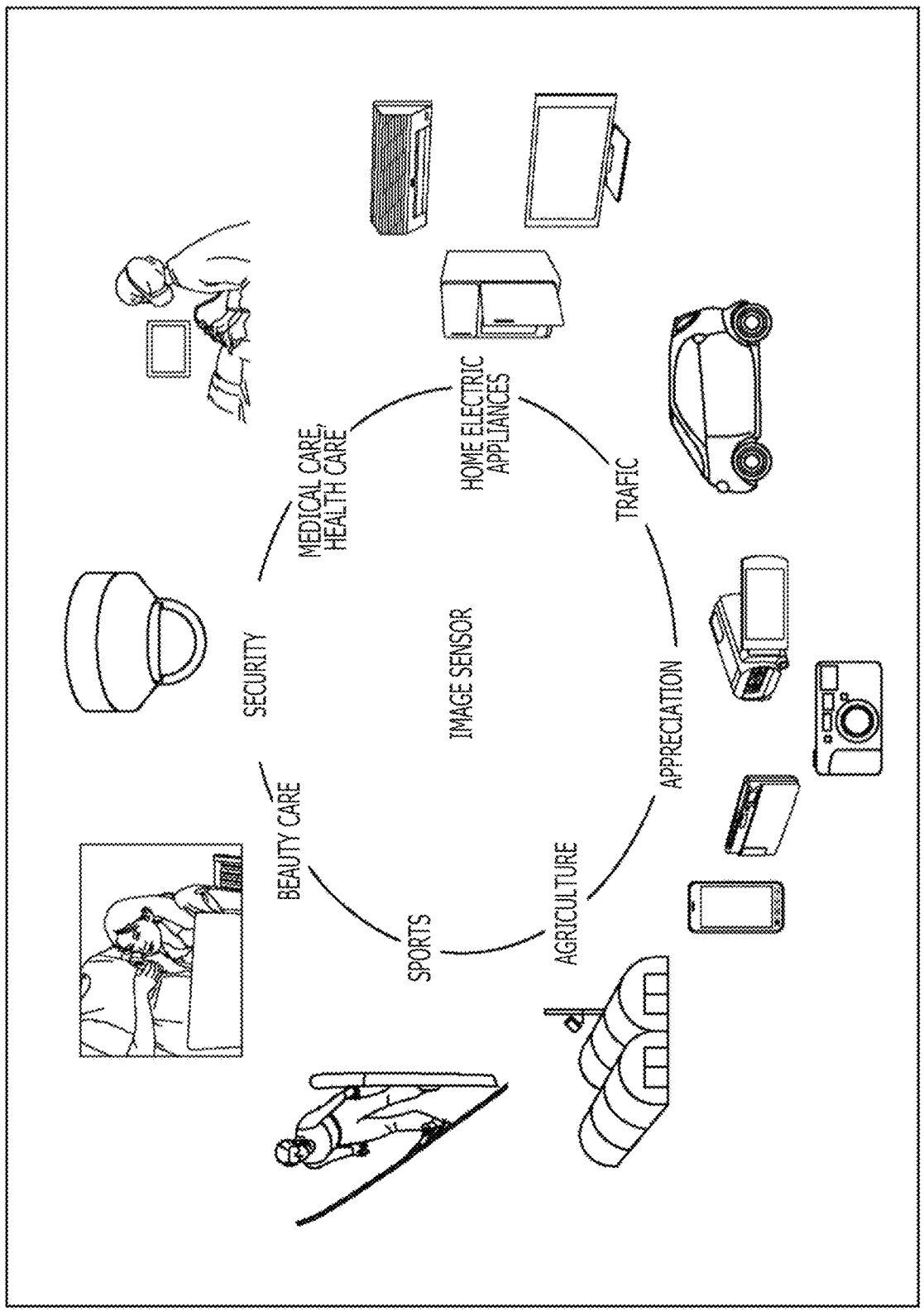

SOLID-STATE IMAGING DEVICE, METHOD OF DRIVING SOLID-STATE IMAGING DEVICE, AND ELECTRONIC DEVICE

CROSS REFERENCE TO RELATED APPLICATIONS

This application is a U.S. National Stage entry under 35 U.S.C. 371 of International Application No. PCT/JP2016/073038, filed in the Japan Patent Office on Aug. 5, 2016, which claims priority to Patent Application No. JP2015-162429, filed in the Japan Patent Office on Aug. 20, 2015, each of which is incorporated herein by reference in its entirety.

TECHNICAL FIELD

The present technology relates to a solid-state imaging device, a method of driving a solid-state imaging device, and an electronic device, and particularly to a solid-state imaging device, a method of driving a solid-state imaging device, and an electronic device which are capable of reducing power supply noise of a pixel signal.

BACKGROUND ART

Existing CMOS image sensors are of such a structure that their pixel regions including photoelectric transducers are likely to propagate power supply noise, and power supply noise in such a pixel circuit is prevalent in power supply noise in the entire CMOS image sensors.

As a solution, it has heretofore been proposed to input a pixel signal including power supply noise and a signal that has mirrored the power supply noise to an amplifier with differential inputs for thereby removing the power supply noise from the pixel signal (see, for example, PTL 1).

CITATION LIST

Patent Literature

[PTL 1]
  JP 2007-159115A

SUMMARY

Technical Problem

However, according to the invention described in PTL 1, since each CDS (Correlated Double Sampling) circuit needs an amplifier with differential inputs, the consumed electric power and circuit scale are large compared with amplifiers having a single-ended configuration, for example.

In view of this, the present technology serves to reduce power supply noise of a pixel signal with a single-ended circuit arrangement.

Solution to Problem

A solid-state imaging device according to an aspect of the present technology includes a pixel section including a plurality of unit pixels disposed for photoelectric transduction, a power supply noise detector detecting a noise component from a power supply used to energize the unit pixels and outputting a single-ended canceling signal including a canceling component for canceling the noise component, a sample and hold section configured to sample single-ended pixel signals output from the unit pixels and hold and output pixel signals representing the sampled pixel signals from which the noise component has been removed on the basis of the canceling signal, and an A/D converter performing A/D (Analog/Digital) conversion on the pixel signals that have been held.

The power supply noise detector may include a first electric charge storage section configured to store an electric charge based on the pixel signals, and a second electric charge storage section configured to store an electric charge based on the canceling signal, the second electric charge storage section having a reference potential shared with the first electric charge storage section.

The second electric charge storage section may store a canceling electric charge which is essentially in the same quantity as a noise electric charge stored in the first electric charge storage section by the noise component of the pixel signal, by way of the canceling component of the canceling signal during a sampling period of the pixel signal.

During a holding period of the pixel signal, the sample and hold section may cancel out the noise electric charge stored in the first electric charge storage section during the sampling period and the canceling electric charge stored in the second electric charge storage section during the sampling period.

The canceling component may be a component representing the noise component amplified by a predetermined gain, and the capacity of the second electric charge storage section may be smaller than the capacity of the first electric charge storage section by a degree corresponding to the predetermined gain.

The phase of the canceling component may be a phase inverted from the phase of the noise component.

The power supply noise detector may include an adjusting mechanism adjusting the gain and the phase of the canceling component.

An end of the second electric charge storage section which is different from the end thereof that is set to the reference potential may be connected to the output of the power supply noise detector through a first switch which is turned on during a sampling period of the pixel signal, and connected to an end of the first electric charge storage section which is different from the end thereof that is set to the reference potential through a second switch which is turned on during a holding period of the pixel signal.

The power supply noise detector may include a first output outputting the canceling signal, and a second output outputting a single-ended reference signal representing a bias voltage of the canceling signal, and an end of the second electric charge storage section which is different from the end thereof that is set to the reference potential may be connected to the first output through a first switch which is turned on during a sampling period of the pixel signal, and connected to the second output through a second switch which is turned on during a holding period of the pixel signal.

A method of driving a solid-state imaging device according to an aspect of the present technology includes a power supply noise detecting step of detecting a noise component from a power supply used to energize a plurality of unit pixels disposed for photoelectric transduction, and outputting a single-ended canceling signal including a canceling component for canceling the noise component, a sample and hold step of sampling single-ended pixel signals output from the unit pixels and holding and outputting pixel signals representing the sampled pixel signals from which the noise component has been removed on the basis of the canceling signal, and an A/D converting step of performing A/D (Analog/Digital) conversion on the pixel signals that have been held.

An electronic device according to an aspect of the present technology includes a solid-state imaging device including a pixel section including a plurality of unit pixels disposed for photoelectric transduction, a power supply noise detector detecting a noise component from a power supply used to energize the unit pixels and outputting a single-ended canceling signal including a canceling component for canceling the noise component, a sample and hold section configured to sample single-ended pixel signals output from the unit pixels and hold and output pixel signals representing the sampled pixel signals from which the noise component has been removed on the basis of the canceling signal, and an A/D converter performing A/D (Analog/Digital) conversion on the pixel signals that have been held.

According to an aspect of the present technology, a noise component from a power supply used to energize a plurality of unit pixels for photoelectric transduction is detected, a single-ended canceling signal including a canceling component for canceling the noise component is output, single-ended pixel signals output from the unit pixels are sampled, pixel signals representing the sampled pixel signals from which the noise component has been removed are held and output on the basis of the canceling signal, and A/D (Analog/Digital) conversion is performed on the pixel signals that have been held.

The semiconductor device and the electronic device may be independent components or devices, or may be modules to be incorporated in other devices.

Advantageous Effect of Invention

According to an aspect of the present invention, power supply noise of a pixel signal can be reduced.

Note that the advantages described herein are not necessarily restrictive, and any of the advantages described in the present disclosure are applicable.

BRIEF DESCRIPTION OF DRAWINGS

FIG. 5 is a circuit diagram depicting a second embodiment of the power supply noise canceler.

FIG. 15 is a diagram depicting examples in which a solid-stage imaging device is used.

DESCRIPTION OF EMBODIMENTS

Modes (hereinafter referred to as "embodiments") for carrying out the invention will hereinafter be described in detail below with reference to the drawings. Note that the description will be given in the following order:
1. Solid-state imaging device to which the present technology is applied;
2. First embodiment;
3. Second embodiment (modification of the first embodiment);
4. Third embodiment (Example 1 in which a plurality of sample and hold circuits operate in parallel);
5. Fourth embodiment (Example 2 in which a plurality of sample and hold circuits operate in parallel);
6. Fifth embodiment (Example 1 applied to CDS);
7. Sixth embodiment (Example 1 applied to CDS);
8. Modifications;
9. Example applied to an electronic device;
10. Examples in which a solid-state imaging device is used.

<1. Solid-state Imaging Device to which the Present Technology is Applied>

{1-1. Basic System Arrangement}

Figure 1:
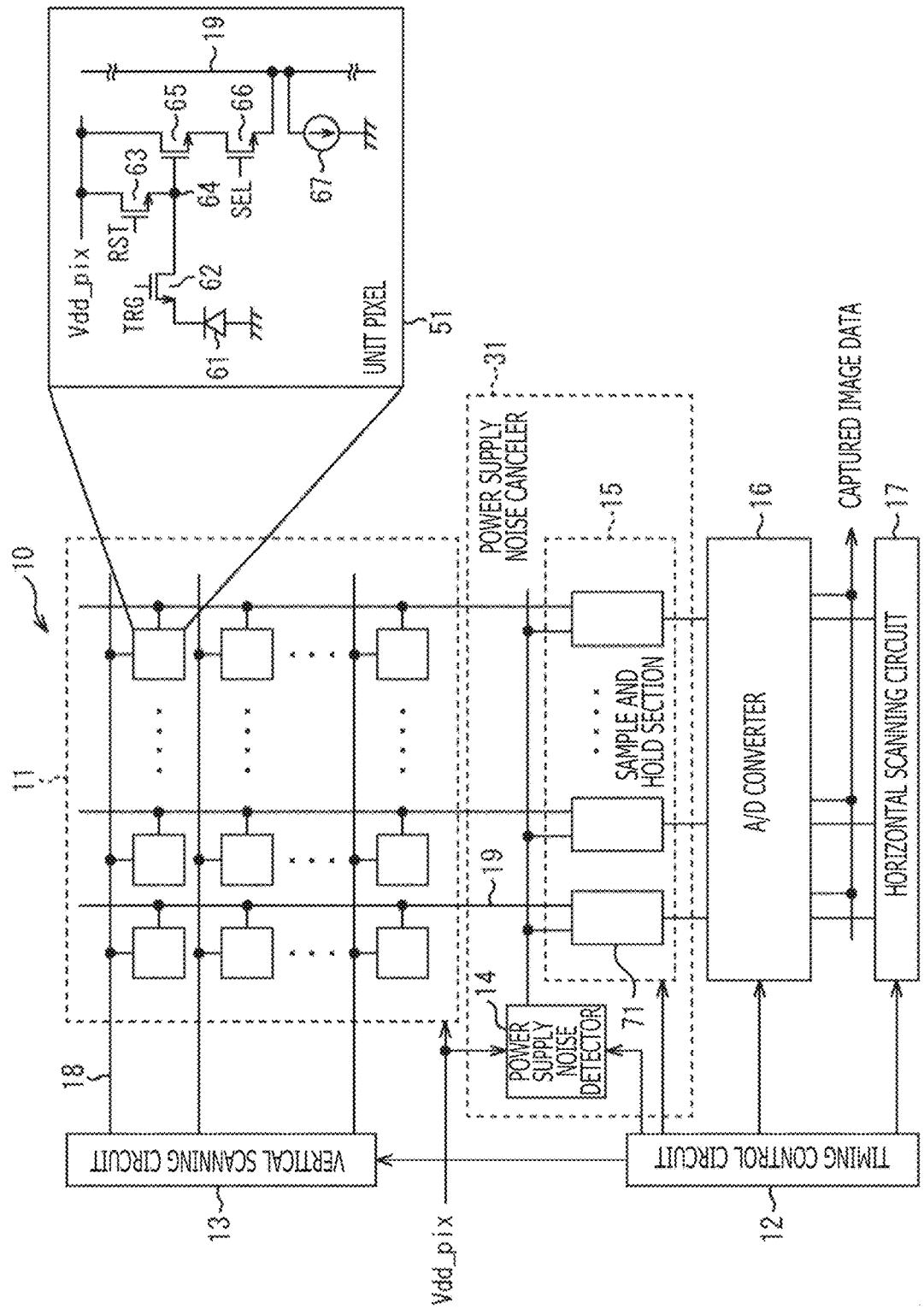
FIG. 1 is a circuit diagram depicting an embodiment of a CMOS image sensor to which the present technology is applied.

FIG. 1 is a system makeup diagram depicting a general arrangement of a solid-state imaging device to which the present technology is applied, e.g., a CMOS image sensor which is a kind of an XY-addressable solid-state imaging device. Here, the CMOS image sensor refers to an image sensor produced applying or partly using a CMOS process.

The CMOS image sensor, denoted by 10, includes a pixel section 11, a timing control circuit 12, a vertical scanning circuit 13, a power supply noise detector 14, a sample and hold section 15, an A/D (Analog/Digital) converter 16, and a horizontal scanning circuit 17. Further, the power supply noise detector 14 and the sample and hold section 15 jointly make up a power supply noise canceler 31.

The pixel section 11 includes a two-dimensional array of unit pixels (hereinafter also referred to simply as "pixels") each having a photoelectric transducer 61 for generating and storing electric charges depending on a detected quantity of light, the unit pixels being arranged in the directions of rows and columns, i.e., in a matrix. The direction of rows refers to a direction in which the pixels of pixel rows are arranged (i.e., a horizontal direction), and the direction of columns refers to a direction in which the pixels of pixel columns are arranged (i.e., a vertical direction).

In the pixel section 11, pixel drive lines 18 are disposed in association with the respective pixel rows along the direction of rows and vertical signal lines 19 are disposed in association with the respective pixel columns along the direction of columns within the matrix of pixels. The pixel drive lines 18 transmit drive signals for driving the unit pixels 51 to read signals therefrom. Note that, in FIG. 1, each row is associated with a single pixel drive line 18. However, the pixel drive lines 18 are not limited to a single line per row.

Further, each of the unit pixels 51 of the pixel section 11 is supplied with a power supply voltage Vdd_pix used to drive each unit pixel 51 from a power supply, not depicted.

The timing control circuit 12 supplies clock signal, control signals, etc. to the vertical scanning circuit 13, the power supply noise detector 14, the sample and hold section 15, the A/D converter 16, and the horizontal scanning circuit 17 to control the operations of the respective sections.

The vertical scanning circuit 13 transmits drive signals over the pixel drive lines 18 to drive the unit pixels 51 of the pixel section 11 and read pixel signals therefrom, and selects a row to be read. The vertical scanning circuit 13 outputs pixel signals read from the unit pixels 51 of the row that is selected, to the vertical signal lines 19.

The power supply noise detector 14 detects a noise component of the power supply voltage Vdd_pix supplied to the pixel section 11, and supplies a single-ended canceling signal including a canceling component for canceling the detected noise component, to the sample and hold section 15.

The sample and hold section 15 includes sample and hold circuits 71 connected to each vertical signal lines 19. Each of the sample and hold circuits 71 samples a single-ended pixel signal supplied from each unit pixel 51 through the vertical signal line 19, and holds the sampled pixel signal.

The A/D converter 16 converts analog pixel signals held by the sample and hold circuits 71 into digital signals.

The horizontal scanning circuit 17 transfers the digital pixel signals output from the A/D converter 16 in a horizontal direction, thereby outputting captured image data represented by the digital pixel signals.

Each of the unit pixels 51 includes a photodiode 61, a transfer transistor 62, a reset transistor 63, an FD (floating diffusion) node 64, an amplifying transistor 65, a selection transistor 66, and a current source 67. The transfer transistor 62 is supplied with a transfer signal TRG from the vertical scanning circuit 13 through the pixel drive line 18. The reset transistor 63 is supplied with a reset signal RST from the vertical scanning circuit 13 through the pixel drive line 18. The selection transistor 62 is supplied with a selection signal SEL from the vertical scanning circuit 13 through the pixel drive line 18.

Note that the unit pixels 51 depicted in FIG. 1 have a general circuit arrangement, and will not be described in detail below.

Further, the unit pixels 51 are not limited to the illustrated example, but may be unit pixels having an optional circuit arrangement. Furthermore, each of the unit pixels 51 may of a shared pixel structure. For example, each of the unit pixels 51 of a shared pixel structure includes a plurality of photodiodes 61, a plurality of transfer transistors 62, a shared single FD node 64, and other transistors shared thereby.

<2. First Embodiment>

Next, a first embodiment of the present technology will be described below with reference to FIGS. 2 through 4.

{First Embodiment of the Power Supply Noise Canceler 31}

Figure 2:
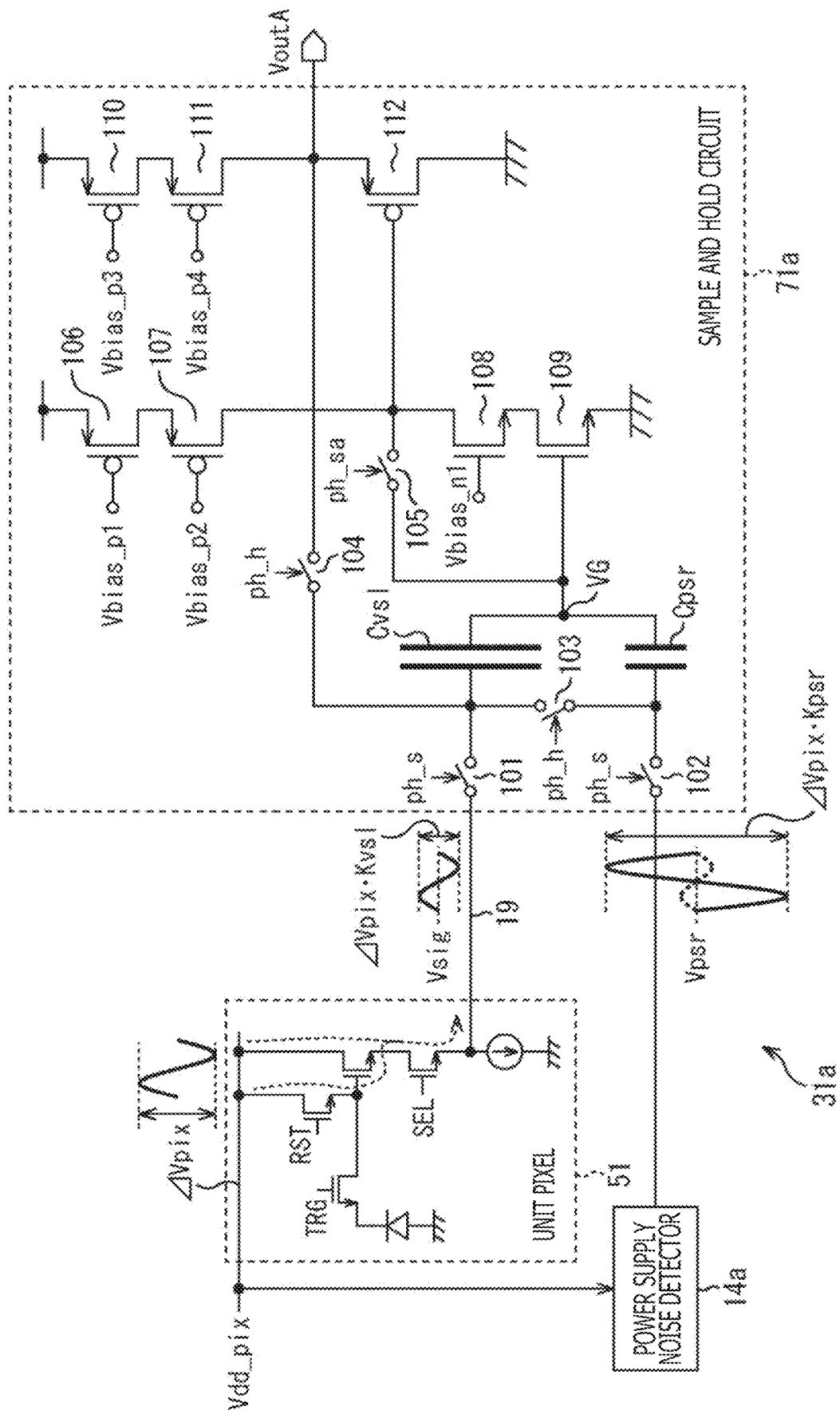
FIG. 2 is a circuit diagram depicting a first embodiment of a power supply noise canceler.
Figure 3:
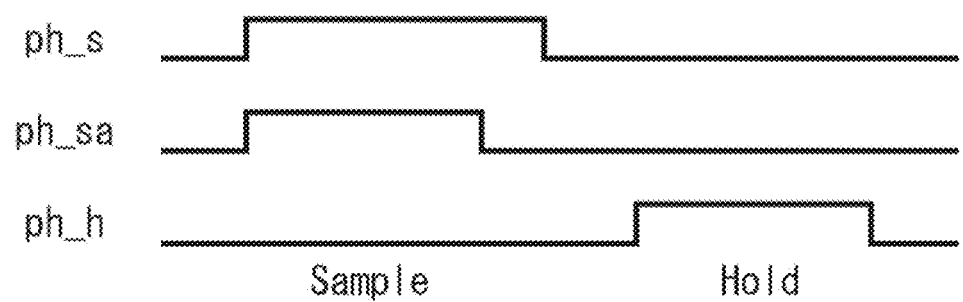
FIG. 3 is a timing chart illustrative of operation of a sample and hold circuit depicted in FIG. 2.

FIG. 2 depicts a configurational example of a power supply noise canceler 31a which is a first embodiment of the power supply noise canceler 31 depicted in FIG. 1. The power supply noise canceler 31a includes a power supply noise detector 14a which is a first embodiment of the power supply noise detector 14 depicted in FIG. 1 and a sample and hold section 15a (not depicted) which is a first embodiment of the sample and hold section 15 depicted in FIG. 1. The sample and hold section 15a includes a plurality of sample and hold circuits 71a which is a first embodiment of the sample and hold circuit 71 depicted in FIG. 1.

Note that, in FIG. 2, only one unit pixel 51, the power supply noise detector 14a, and one sample and hold circuit 71a are depicted for illustrative purposes. Moreover, some reference characters are also omitted from illustration for illustrative purposes.

The sample and hold circuit 71a includes switches 101 through 105, transistors 106 through 112, and sampling capacitances Cvsl and Cpsr. The transistors 106, 107, and 110 through 112 include p-type MOSFETs, and the transistors 108 and 109 include n-type MOSFETs. The sampling capacitances Cvsl and Cpsr include capacitors, for example.

The sampling capacitance Cvsl stores electric charges based on a single-ended pixel signal supplied from the unit pixel 51 through the vertical signal line 19. One end of the sampling capacitance Cvsl is connected to the vertical signal line 19 through the switch 101 and is also connected to the drain of the transistor 111 and the source of the transistor 112 through the switch 104. The other end of the sampling capacitance Cvsl is connected to the gate of the transistor 109 and is also connected to the drain of the transistor 107, the drain of the transistor 108, and the gate of the transistor 112 through the switch 105.

The sampling capacitance Cpsr stores electric charges based on a single-ended canceling signal supplied from the power supply noise detector 14a. One end of the sampling capacitance Cpsr is connected to the output of the power supply noise detector 14a through the switch 102 and is also connected through the switch 103 to the end of the sampling capacitance Cvsl which is connected to the vertical signal line 19 through the switch 101. The other end of the sampling capacitance Cpsr is connected to the other end of the sampling capacitance Cvsl. Therefore, the sampling capacitance Cvsl and the sampling capacitance Cpsr are set to a common sampling reference potential (e.g., the potential of a virtual ground point VG).

Note that it assumed hereinbelow that the sampling capacitance Cvsl has a capacity Cvsl and the sampling capacitance Cpsr has a capacity Cpsr.

The source of the transistor 106 is connected to a power supply, not depicted, and the drain thereof is connected to the source of the transistor 107. A gate signal Vbias_p1 is applied to the gate of the transistor 106.

A gate signal Vbias_p2 is applied to the gate of the transistor 107.

The source of the transistor 108 is connected to the drain of the transistor 109. A gate signal Vbias_n1 is applied to the gate of the transistor 108.

The source of the transistor 109 is connected to ground.

The source of the transistor 110 is connected to a power supply, not depicted, and the drain thereof is connected to the source of the transistor 111. A gate signal Vbias_p3 is applied to the gate of the transistor 110.

A gate signal Vbias_p4 is applied to the gate of the transistor 111.

The drain of the transistor 112 is connected to ground.

The switches 101 and 102 are turned on when a sample signal ph_s supplied from the timing control circuit 12 is on (of a high level), and turned off when the sample signal ph_s is off (of a low level).

The switches 103 and 104 are turned on when a hold signal ph_h supplied from the timing control circuit 12 is on, and turned off when the hold signal ph_h is off.

The switch 105 is turned on when a sample signal ph_sa supplied from the timing control circuit 12 is on, and turned off when the sample signal ph_sa is off.

An analog pixel signal representing a source potential VoutA of the transistor 112 is output from the sample and hold circuit 71a.

{Operation of the sample and hold circuit 71a} Next, operation of the sample and hold circuit 71a will be described below with reference to a timing chart depicted in FIG. 3. The timing chart depicted in FIG. 3 represents the sample signal ph_s, the sample signal ph_sa, and the hold signal ph_h.

First, the sample signal ph_s and the sample signal ph_sa go on, turning on the switches 101, 102, and 105, and a sampling period starts.

Here, if the fluctuation range of a power supply fluctuation (AC component) that represents a noise component of the power supply voltage Vdd_pix is indicated by ΔVpix, a rate at which the power supply fluctuation of the pixel section 11 appears on the vertical signal line 19 is indicated by Kvsl, and the signal component of the pixel signal of the unit pixel 51 is indicated by Vsig, then the pixel signal has an average waveform representing oscillations over a range of ΔVpix·Kvsl across the signal voltage Vsig, as depicted in FIG. 2. Then, an electric charge Qvsl stored in the sampling capacitance Cvsl during the sampling period is indicated by the following equation (1):

$$Qvsl = (Vsig + \Delta Vpix \cdot Kvsl)Cvsla \qquad (1)$$
$$= Vsig \cdot Cvsl + \Delta Vpix \cdot Kvsl \cdot Cvsl$$

Here, in the equation (1), the second term ΔVpix·Kvsl·Cvsl indicates an electric charge stored in the sampling capacitance Cvsl by the power supply noise component (ΔVpix·Kvsl) of the pixel signal. The electric charge will hereinafter be referred to as "noise electric charge ΔQvsl."

Providing the canceling signal output from the power supply noise detector 14a is a signal represented by the sum of a predetermined bias signal Vpsr and a voltage that is produced by multiplying the power supply fluctuation ΔVpix by Kpsr, the canceling signal has an average waveform representing oscillations over a range of ΔVpix·Kpsr across the bias voltage Vpsr, as depicted in FIG. 2. An electric charge Qpsr stored in the sampling capacitance Cpsr during the sampling period is indicated by the following equation (2):

$$Qpsr = (Vpsr + \Delta Vpix \cdot Kpsr)Cpsr \qquad (2)$$
$$= Vsig \cdot Cpsr + \Delta Vpix \cdot Kpsr \cdot Cpsr$$

Here, in the equation (2), the second term ΔVpix·Kpsr·Cpsr indicates an electric charge stored in the sampling capacitance Cpsr by the canceling component (ΔVpix·Kpsr) which is an AC component of the canceling signal. The electric charge will hereinafter be referred to as "canceling electric charge ΔQpsr." Note that the canceling component refers to a component representing the power supply fluctuation ΔVpix amplified by the gain Kpsr.

Then, after the sample signal ph_sa goes off, turning off the switch 105, the sample signal ph_s goes off, turning off the switches 101 and 102, and the sampling period is terminated.

Next, the hold signal ph_h goes on, turning on the switches 103 and 104, and a holding period starts.

At this time, the switch 103 is turned on, connecting both ends of the sampling capacitances Cvsl and Cpsr, whereupon the electric charges Qvsl and Qpsr stored during the sampling period in the sampling capacitances Cvsl and Cpsr are redistributed. Then, the voltage VoutA of the pixel signal output from the sample and hold circuit 71a is indicated by the following equation (3):

$$VoutA = (Qvsl + Qpsr)/(Cvsl + Cpsr) \qquad (3)$$
$$= \{(Vsig + \Delta Vpix \cdot Kvsl)Cvsl + (Vpsr + \Delta Vpix \cdot Kpsr)Cpsr\}/(Cvsl + Cpsr) \cdot$$

Here, given that the gain Kpsr of the power supply noise detector 14a is set according to the following equation (4), the noise electric charge ΔQvsl=− the canceling electric charge ΔQpsr.

$$Kpsr = -Kvsl \cdot Cvsl/Cpsr \qquad (4)$$

Therefore, the redistribution of the electric charges Qvsl and Qpsr stored in the sampling capacitances Cvsl and Cpsr cancels out the noise electric charge ΔQvsl and the canceling electric charge ΔQpsr. Moreover, by substituting the gain Kpsr according to the equation (4) in the equation (3), the voltage VoutA of the pixel signal output from the sample and hold circuit 71a is indicated by the following equation (5):

$$VoutA = (Vsig \cdot Cvsl + Vpsr \cdot Cpsr)/(Cvsl + Cpsr) \qquad (5)$$

In the equation (5), the power supply fluctuation ΔVpix is eliminated in this manner, so that the power supply noise component is removed from the voltage VoutA of the pixel signal output from the sample and hold circuit 71a.

Thereafter, the hold signal ph_h goes off, turning off the switches 103 and 104, and the holding period is terminated.

{Configurational Example of the Power Supply Noise Detector 14a}

Figure 4:
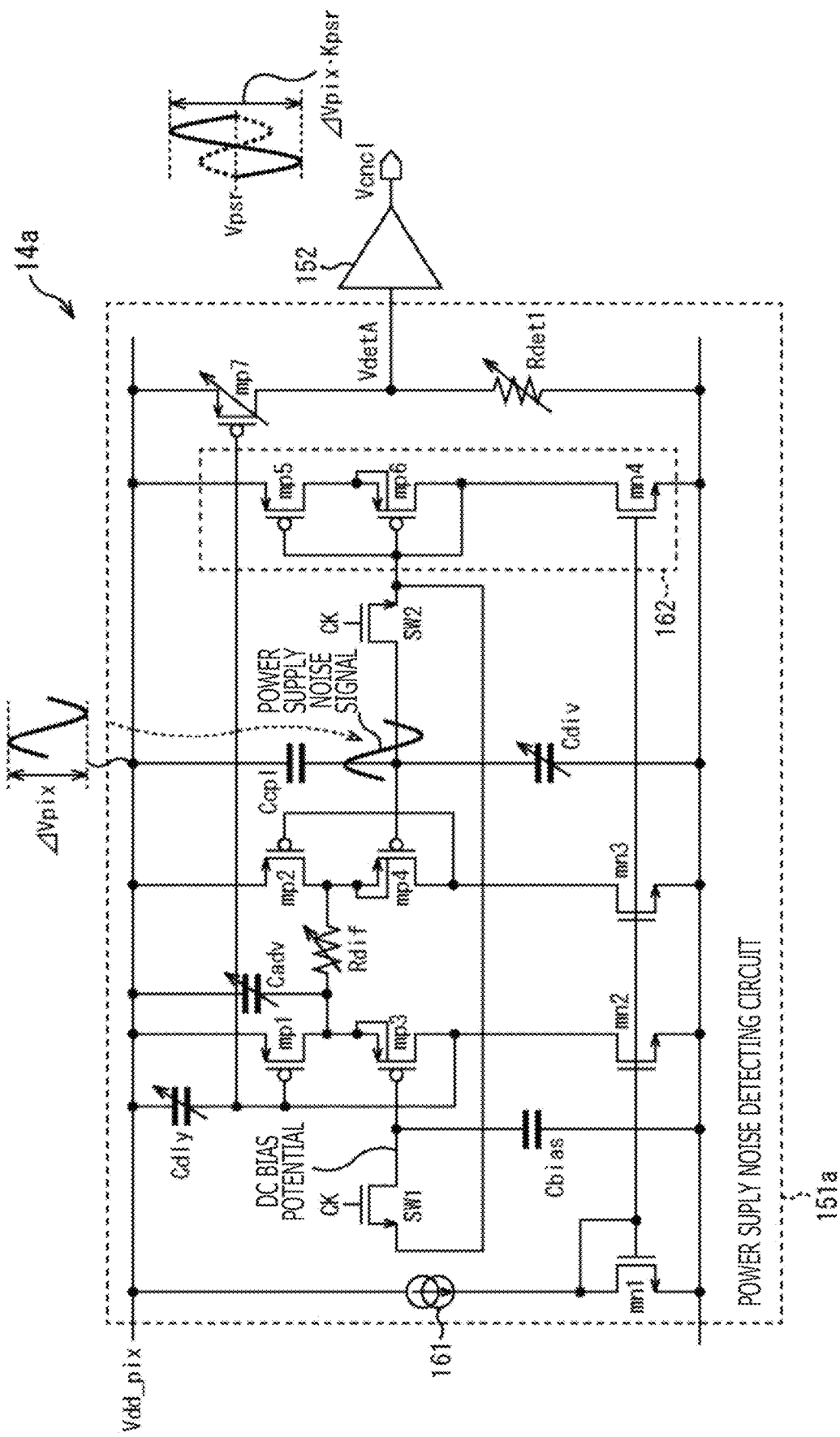
FIG. 4 is a circuit diagram depicting a first embodiment of a power supply noise detector.

FIG. 4 depicts a configurational example of the power supply noise detector 14a depicted in FIG. 2.

The power supply noise detector 14a includes a power supply noise detecting circuit 151a and a buffer amplifier 152. The power supply noise detecting circuit 151a includes transistors mp1 through mp7, transistors mn1 through mn4, switches SW1 and SW2, variable capacitors Cadv and Cdly, a variable capacitance array Cdiv, capacitors Ccpl and Cbias, variable resistors Rdet1 and Rdif, and a current source 161 as a bias current source. The transistors mp1 through mp7 include p-type MOSFETs. The transistor mp7 has its channel width (W) variable. The transistors mn1 through mn4 and the switches SW1 and SW2 include n-type MOSFETs.

The source of the transistor mp1 is connected to a power supply (not depicted) that supplies the power supply voltage Vdd_pix, the source of the transistor mp2, the source of the transistor mp5, and the source of the transistor mp7. Moreover, the source of the transistor mp1 is connected to the drain of the transistor mn1 and the gates of the transistors mn1 through mn4 through the current source 161. Furthermore, the source of the transistor mp1 is connected to the gate of the transistor mp1, the drain of the transistor mp3, the gate of the transistor mp7, and the drain of the transistor mn2 through the variable capacitor Cdly. In addition, the source of the transistor mp1 is also connected to the drain of the transistor mp1 and the source of the transistor mp3 through the variable capacitor Cadly. Moreover, the source of the transistor mp1 is connected to the gate of the transistor mp4 and the drain of the switch SW2 through the capacitor Ccpl. The drain of the transistor mp1 is connected to the drain of the transistor mp2 and the source of the transistor mp4 through the variable resistor Rdif.

The gate of the transistor mp2 is connected to the drain of the transistor mp4 and the drain of the transistor mn3.

The gate of the transistor mp3 is connected to the drain of the switch SW1. Furthermore, the gate of the transistor mp3 is connected to the sources of the transistors mn1 through mn4 through the capacitor Cbias. The back gate of the transistor mp3 is connected to the source of the transistor mp3.

The gate of the transistor mp4 is connected to the sources of the transistors mn1 through mn4 through the variable capacitance array Cdiv. The back gate of the transistor mp4 is connected to the source of the transistor mp4.

The gate of the transistor mp5 is connected to the gate and drain of the transistor mp6, the drain of the transistor mn4, the source of the switch SW1, and the source of the switch SW2. The drain of the transistor mp5 is connected to the source of the transistor mp6. The back gate of the transistor mp6 is connected to the source of the transistor mp6.

The drain of the transistor mp7 is connected to the input of the buffer amplifier 152. Furthermore, the drain of the transistor mp7 is connected to the sources of the transistors mn1 through mn4 through the variable resistor Rdet1. The sources of the transistors mn1 through mn4 are set to ground potential.

A clock signal CK is input to the gates of the switches SW1 and SW2.

Then, the transistors mp1 and mp2 make up a differential amplifier. Moreover, the transistors mp5, mp6, and mn4 make up a differential amplifier input bias source 162.

{Operation of the Power Supply Noise Detector 14a}

Next, operation of the power supply noise detector 14a will briefly be described below.

The capacitor Cbias, which serves as a bias voltage source, is charged by a current supplied from the differential amplifier input bias source 162 through the switch SW1. Further, the variable capacitance array Cdiv, which serves as a bias voltage source, is charged by a current supplied from the differential amplifier input bias source 162 through the switch SW2. Here, when the clock signal CK is applied periodically (e.g., in each horizontal synchronizing signal period) to the switches SW1 and SW2 to charge the capacitor Cbias and the variable capacitance array Cdiv, the differential amplifier including the transistors mp1 and mp2 can be operated at an optimum operating point.

Further, the component of the power supply fluctuation ΔVpix contained in the power supply voltage Vdd_pix input from the non-illustrated power supply passes through the Ccpl. A power supply noise voltage, which is the sum of a voltage based on the power supply fluctuation ΔVpix and the bias potential given by the variable capacitance array Cdiv, is input to the gate of the transistor mp4, which serves as an input of the differential amplifier.

Besides, the gate potential of the transistor mp3, which serves as the other input of the differential amplifier, is set to a predetermined DC bias potential by the capacitor Cbias. The DC bias potential is set to a potential that is substantially the same as the bias potential from the variable capacitance array Cdiv. Further, the DC bias potential is not affected by the power supply fluctuation ΔVpix.

Then, a voltage based on the difference between the power supply noise voltage and the DC bias potential that are input to the differential amplifier, i.e., a voltage based on the power supply fluctuation ΔVpix contained in the power supply voltage Vdd_pix, is applied across the variable resistor Rdif, which converts the voltage into a current.

Here, if the resistance value of the variable resistor Rdif is large, the variable resistor Rdif will serve as a thermal noise source. Therefore, the resistance value of the variable resistor Rdif cannot be set to too a large value. On the other hand, if the resistance value of the variable resistor Rdif is small, a steady current flowing through the variable resistor Rdif will increase.

However, since the variable resistor Rdif is inserted between the source of the transistor mp3 and the source of the transistor mp4, which serve as a differential input pair of the differential amplifier, the voltage applied across the variable resistor Rdif can be reduced. The resistance value of the variable resistor Rdif can thus be reduced without causing a steady current through the variable resistor Rdif to increase.

Furthermore, the gates of the transistors mp1 and mp2, which serve as a PMOS current source of the differential amplifier, are connected respectively to the drains of the transistors mp3 and mp4, which serve as a differential input pair. Consequently, the transconductances Gm of the transistors mp3 and mp4 can be increased, resulting in a reduction in the attenuation of a current into which the power supply fluctuation ΔVpix is converted across the variable resistor Rdif.

A current, which represents the difference between the bias current flowing through the transistor mn2 that cooperates with the transistor mn1 in constituting a current mirror and the current flowing through the variable resistor Rdif, flows through the transistor mp1. The current flowing through the transistor mp1 is copied by the transistor mp7 that cooperates with the transistor mn1 in constituting a current mirror. Furthermore, the current flowing through the transistor mp7 is converted by the variable resistor Rdet1 into a voltage VdetA, which is input to the buffer amplifier 152.

The buffer amplifier 152 converts the input voltage VdetA into a canceling voltage Vcncl and outputs a canceling signal representing the canceling voltage Vcncl. The canceling voltage Vcncl represents a voltage that is the sum of the voltage of a canceling component representing the power supply fluctuation ΔVpix inverted in phase and multiplied by Kpsr and the bias voltage Vpsr. Incidentally, the bias voltage Vpsr is determined by the operating point of the buffer amplifier 152 on the basis of the voltage VdetA.

Note that the buffer amplifier 152 is required in case a large capacitive load or resistive load is connected to a stage following the power supply noise detector 14a. Otherwise, the buffer amplifier 152 may be dispensed with.

Next, examples of processes of adjusting the gain Kpsr and phase of the canceling component included in the canceling signal that is output from the power supply noise detector 14a will be described below.

A route along which the power supply fluctuation ΔVpix of the power supply voltage Vdd_pix goes through the pixel section 11 to the sample and hold section 15a and a route along which the power supply fluctuation ΔVpix of the power supply voltage Vdd_pix goes through the power supply noise detector 14a to the sample and hold section 15a are different from each other as to circuit arrangement and circuit scale. Therefore, the transfer characteristic in the former route (hereinafter referred to as "pixel-route transfer characteristic") and the transfer characteristic in the latter route (hereinafter referred to as "detection-route transfer characteristic") are different from each other as to gain and phase characteristic. Therefore, a mechanism for adjusting the gain and phase of the detection-route transfer characteristic is provided in the power supply noise detector 14 in order that the gain Kpsr of the power supply noise detector 14a can be set according to the equation (4) described above.

For example, the gain of the detection-route transfer characteristic can be adjusted by adjusting a ratio Redet1/Rdif between the resistance value of the variable resistor Rdif and the resistance value of the variable resistor Rdet1.

Moreover, for example, the gain of the detection-route transfer characteristic can be adjusted by adjusting the ratio of the current mirror that includes the transistor mp1 and the transistor mp7.

Furthermore, providing the transistor mp4 has a gate capacitance Cg, for example, the ratio of the component based on the power supply fluctuation ΔVpix to the power supply noise voltage input to the gate of the transistor mp4 is determined by a voltage division ratio expressed by Ccpl/(Ccpl+Cdiv+Cg). Therefore, the gain of the detection-route transfer characteristic can be adjusted by adjusting capacitance Cdiv of the variable capacitance array Cdiv thereby to adjust the above-mentioned voltage division ratio.

Note that the third adjusting process makes it possible to adjust the gain without changing the thermal noise characteristic appearing in the output as the DC current value and the resistance value are not changed compared with the first and second adjusting processes. However, since the gain can be reduced, but not amplified according to the third adjusting process, it is necessary to use other adjusting processes in combination with the third adjusting process in some applications.

Moreover, the phase of the detection-route transfer characteristic can be adjusted in an advancing direction by adjusting the capacitance of the variable capacitor Cadv, for example. On the other hand, the phase of the detection-route transfer characteristic can be adjusted in a delaying direction by adjusting the capacitance of the variable capacitor Cdly, for example.

As described above, the gain Kpsr can be set according to the above equation (4) by adjusting the gain and phase of the detection-route transfer characteristic.

Incidentally, the power supply noise detector 14a depicted in FIG. 4 is illustrated as employing a PMOS differential input differential amplifier. However, it may employ an NMOS differential input differential amplifier.

In the manner described above, the power supply noise component of the pixel signal output from the pixel section 11 can be reduced by the single-ended circuit arrangement. The consumed electric power and circuit scale can thus be reduced compared with PTL 1 cited above which employs a differential input circuit.

Further, according to the equation (4) described above, the capacity Cpsr of the necessary sampling capacitance Cpsr is equal to Kvsl/Kpsr of the capacity Cvsl of the sampling capacitance Cvsl. Therefore, by increasing the gain Kpsr of the power supply noise detector 14a, the capacity Cpsr of the sampling capacitance Cpsr can be made smaller than capacity Cvsl of the sampling capacitance Cvsl by a degree commensurate with the gain Kpsr. Accordingly, the sample and hold circuit 71a can be realized by adding a small number of devices to the existing sample and hold circuit.

Furthermore, the CMOS image sensor 10 has its consumed electric power and circuit scale reduced to a greater extent as it includes a plurality of identical circuits arranged parallel to each other.

<3. Second Embodiment>

Next, a second embodiment of the present technology will be described below with reference to FIGS. 5 and 6.

{Second Embodiment of the Power Supply Noise Canceler 31}

FIG. 5 is a circuit diagram depicting a power supply noise canceler 31b which is a second embodiment of the power supply noise canceler 31 depicted in FIG. 1.

The power supply noise canceler 31b is different from the power supply noise canceler 31a depicted in FIG. 2 in that it includes a power supply noise detector 14b and a sample and hold section 15b (not depicted) instead of the power supply noise detector 14a and the sample and hold section 15a. The sample and hold section 15b includes a plurality of sample and hold circuits 71b which are a second embodiment of the sample and hold circuit 71 depicted in FIG. 1.

Note that in FIG. 5, only one unit pixel 51, the power supply noise detector 14b, and one sample and hold circuit 71b are depicted for illustrative purposes. Moreover, some reference symbols are also omitted from illustration for illustrative purposes.

The sample and hold circuit 71b is different from the sample and hold circuit 71a depicted in FIG. 2 in that it includes a switch 201 instead of the switch 103.

The end of the sampling capacitance Cpsr which is connected to the power supply noise detector 14b through the switch 102 is connected to the power supply noise detector 14b through the switch 201. Then, a reference signal (to be described later) output from the power supply noise detector 14b is input to the sampling capacitance Cpsr through the switch 201.

The switch 201 is turned on when the hold signal ph_h supplied from the timing control circuit 12 is on, and turned off when the hold signal ph_h is off.

{Configurational Example of the Power Supply Noise Detector 14b}

Figure 6:
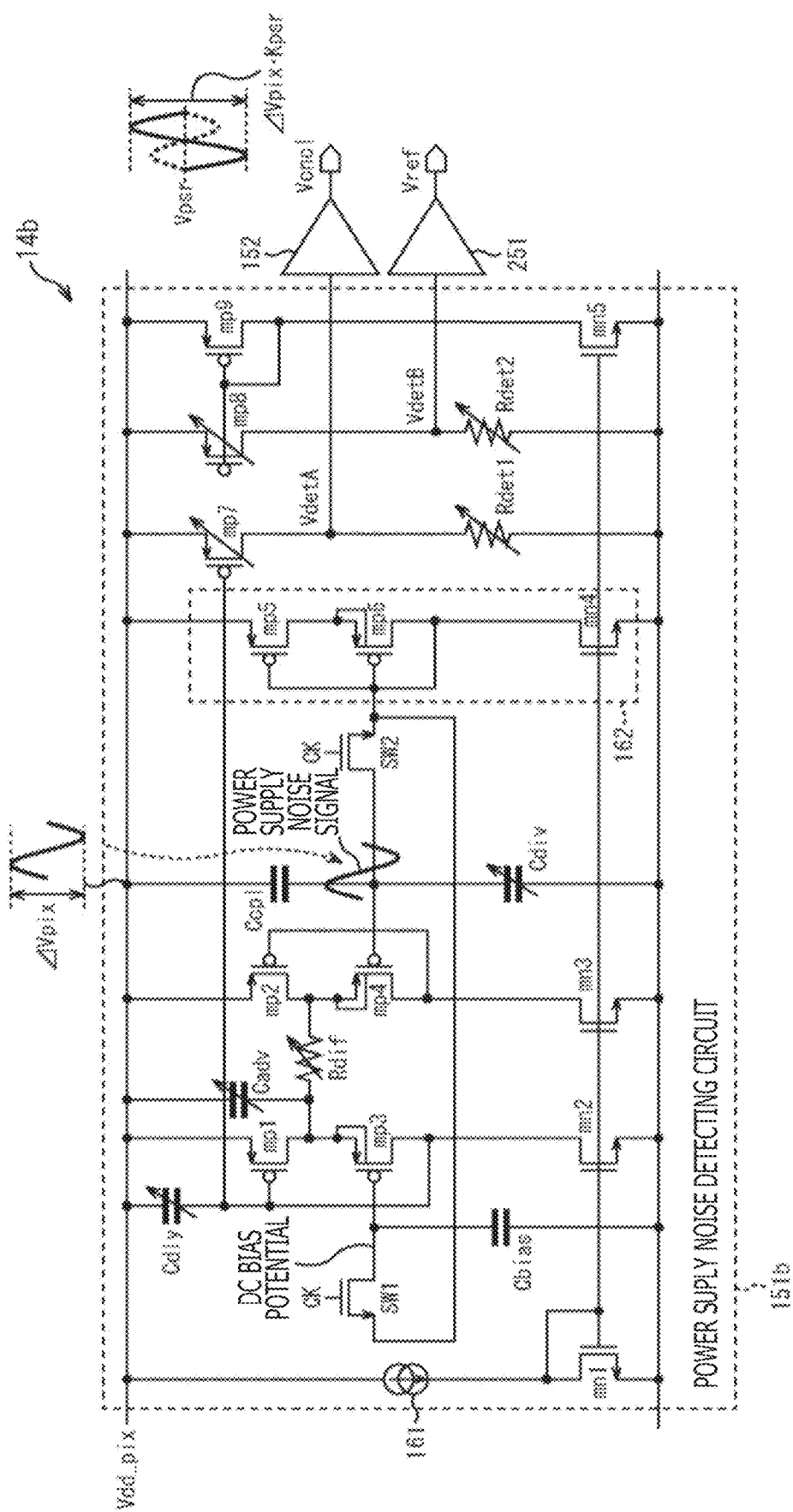
FIG. 6 is a circuit diagram depicting a second embodiment of the power supply noise detector.

FIG. 6 depicts a configurational example of the power supply noise detector 14b depicted in FIG. 5. Note that those parts which correspond to those depicted in FIG. 4 are denoted by identical reference symbols.

The power supply noise detector 14b is different from the power supply noise detector 14a depicted in FIG. 4 in that it includes a power supply noise detecting circuit 151b instead of the power supply noise detecting circuit 151a and also includes an additional buffer amplifier 251. The power supply noise detecting circuit 151b is different from the power supply noise detecting circuit 151a depicted in FIG. 4 in that it includes additional transistors mp8, mp9, mn5 and an additional variable resistor Rdet2. The transistors mp8, mp9 include p-type MOSFETs, and the transistor mn5 includes an n-type MOSFET. The transistor mp8 has its channel width (W) variable.

The source of the transistor mp8 is connected to the source of the transistor mp1 and the source of the transistor mp9. The gate of the transistor mp8 is connected to the gate and drain of the transistor mp9 and the drain of the transistor mn5. The drain of the transistor mp8 is connected to the input of the buffer amplifier 251. The drain of the transistor mp8 is also connected to the source of the transistor mn1 and the source of the transistor mn5 through the variable resistor Rdet2. The sources of the transistors mn1 through mn5 are set to ground potential.

The gate of the transistor mn5 is connected to the gates of the transistors mn1 through mn4.

The resistance value of the variable resistor Rdet2 is adjusted so as to be the same as the resistance value of the variable resistor Rdet1. In addition, a current which is substantially the same as the bias current flowing through the transistor mn2 flows through the transistor mp8 because of a circuit including the additional transistors mp8, mp9, and mn5. The current flowing through the transistor mp8 does not include an AC component due to the power supply fluctuation ΔVpix flowing through the variable resistor Rdif. Then, the current flowing through the transistor mp8 is converted by the variable resistor Rdet2 into a voltage VdetB, which is input to the buffer amplifier 251.

The buffer amplifier 251 converts the input voltage VdetB into a reference voltage Vref, and outputs a reference signal representing the reference voltage Vref. Here, the operating point of the buffer amplifier 251 is adjusted so that the reference voltage Vref becomes a voltage that is substantially the same as the bias voltage Vpsr.

{Operation of the Sample and Hold Circuit 71b}

Next, operation of the sample and hold circuit 71b will be described below. The sample and hold circuit 71b operates according to the timing chart depicted earlier in FIG. 3.

First, the sample signal ph_s and the sample signal ph_sa go on, turning on the switches 101, 102, and 105, and a sampling period starts. As a result, the electric charge Qvsl indicated by the equation (1) described above is now stored in the sampling capacitance Cvsl. In addition, the electric charge Qpsr indicated by the equation (2) described above is stored in the sampling capacitance Cpsr.

Here, providing the potential at a virtual ground point VG of the sample and hold circuit 71b is represented by Vshg, an electric charge Qvg_samp at the virtual ground point VG during the sampling period in which the sample signals ph_s and ph_sa are on is indicated by the following equation (6), given that the charge injection, feed through, gate parasitic capacitance, etc. of the switches are ignored:

$$Qvg\_samp = \{Vshg-(Vsig+\Delta Vpix \cdot Kvsl)\} \cdot Cvsl + \{Vshg-(Vpsr+\Delta pix \cdot Kpsr)\} \cdot Cpsr \quad (6)$$

Then, after the sample signal ph_sa goes off, turning off the switch 105, the sample signal ph_s goes off, turning off the switches 101, 102, and 105, and the sampling period is terminated.

Next, the hold signal ph_h goes on, turning on the switches 104 and 201, and a holding period starts.

Here, providing the output voltage of the sample and hold circuit is indicated by VoutB, an electric charge Qvg_hold at the virtual ground point VG during the holding period is indicated by the following equation (7):

$$Qvg\_hold = (Vshg-VoutB)Cvsl + (Vshg-Vpsr)Cpsr \quad (7)$$

Since the electric charges at the virtual ground point VG during the sampling period and the holding period are equal to each other according to the principle of conservation of charge, the electric charge Qvg_samp=the electric charge Qvg_hold. Therefore, because of the equations (6) and (7) described above, the output voltage VoutB of the sample and hold circuit 71b is indicated by the following equation (8):

$$VoutB = Vsig + \Delta Vpix(Kvsl + Kpsr \cdot Cpsr/Cvsl) \quad (8)$$

Here, as described above, given that the gain Kpsr of the power supply noise detector 14b is set according to the above equation (4), the noise electric charge ΔQvsl=− the canceling electric charge ΔQpsr. At the virtual ground point VG, the noise electric charge ΔQvsl and the canceling electric charge ΔQpsr cancel each other. In addition, by substituting the gain Kpsr according to the equation (4) in the equation (8), the voltage VoutB of the pixel signal output from the sample and hold circuit 71b is indicated by the following equation (9):

$$VoutB = Vsig \quad (9)$$

In this way, in the equation (9), the power supply fluctuation ΔVpix is eliminated, so that the power supply noise component is removed from the output voltage VoutB from the sample and hold circuit 71b, making the output voltage VoutB equal to the signal component Vsig of the pixel signal.

In such a way described above, as with the first embodiment, the power supply noise component of the pixel signal output from the pixel section 11 can thus be reduced by the single-ended circuit arrangement.

In addition, as with the first embodiment, the capacity Cvsl of the sampling capacitance Cvsl can be reduced by increasing the gain Kpsr of the power supply noise detector 14b. Accordingly, the sample and hold circuit 71b can be realized by adding a small number of devices to the conventional sample and hold circuit.

<4. Third Embodiment>

Next, a third embodiment of the present technology will be described below with reference to FIGS. 7 and 8. According to the third embodiment, N sample and hold circuits 71a are connected parallel to one vertical signal line 19. Then, the N sample and hold circuits 71a sample and hold pixel signals from a plurality of unit pixels 51 that are connected to the vertical signal line 19.

{Third Embodiment of the Power Supply Noise Canceler 31}

Figure 7:
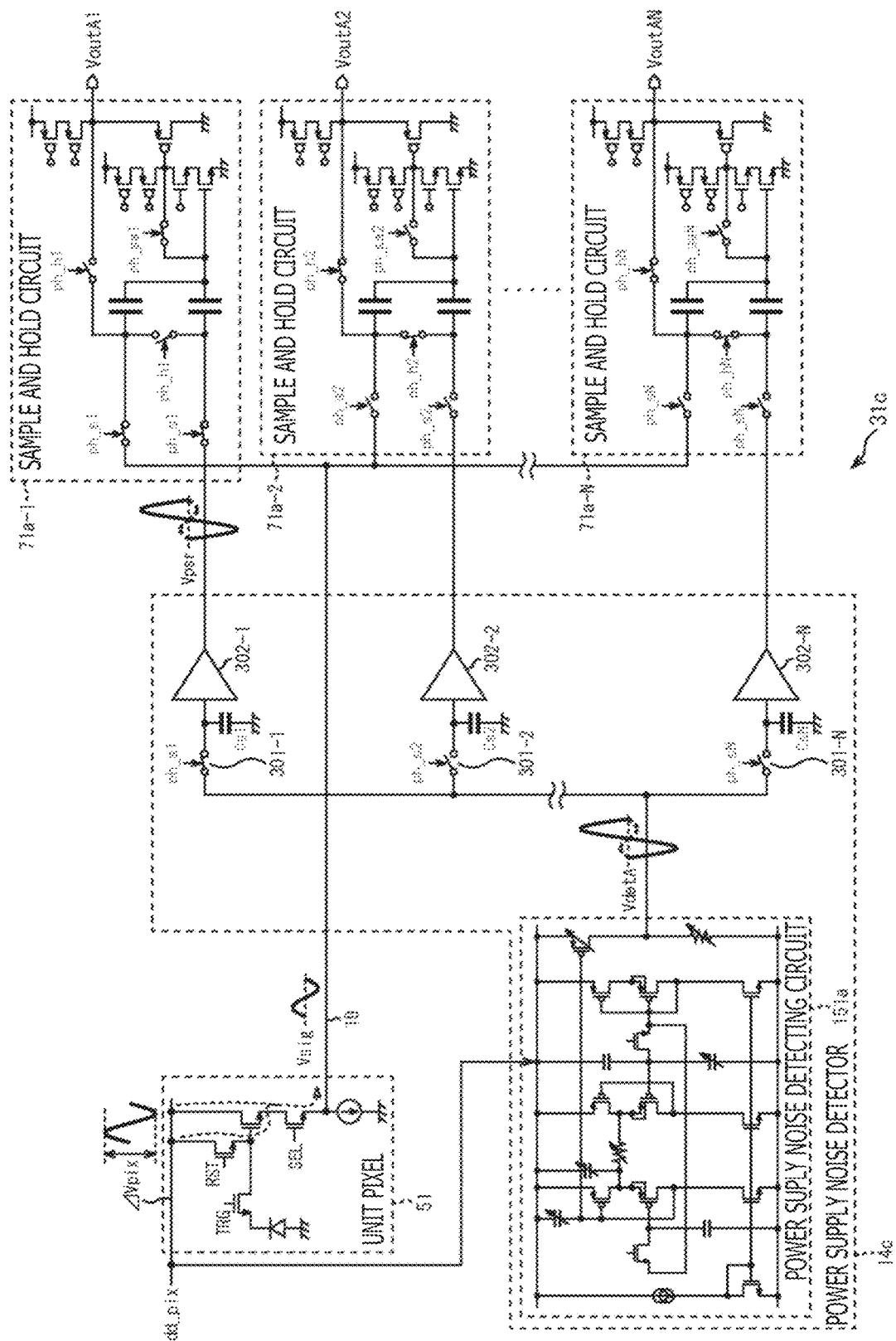
FIG. 7 is a circuit diagram depicting a third embodiment of the power supply noise canceler.
Figure 8:
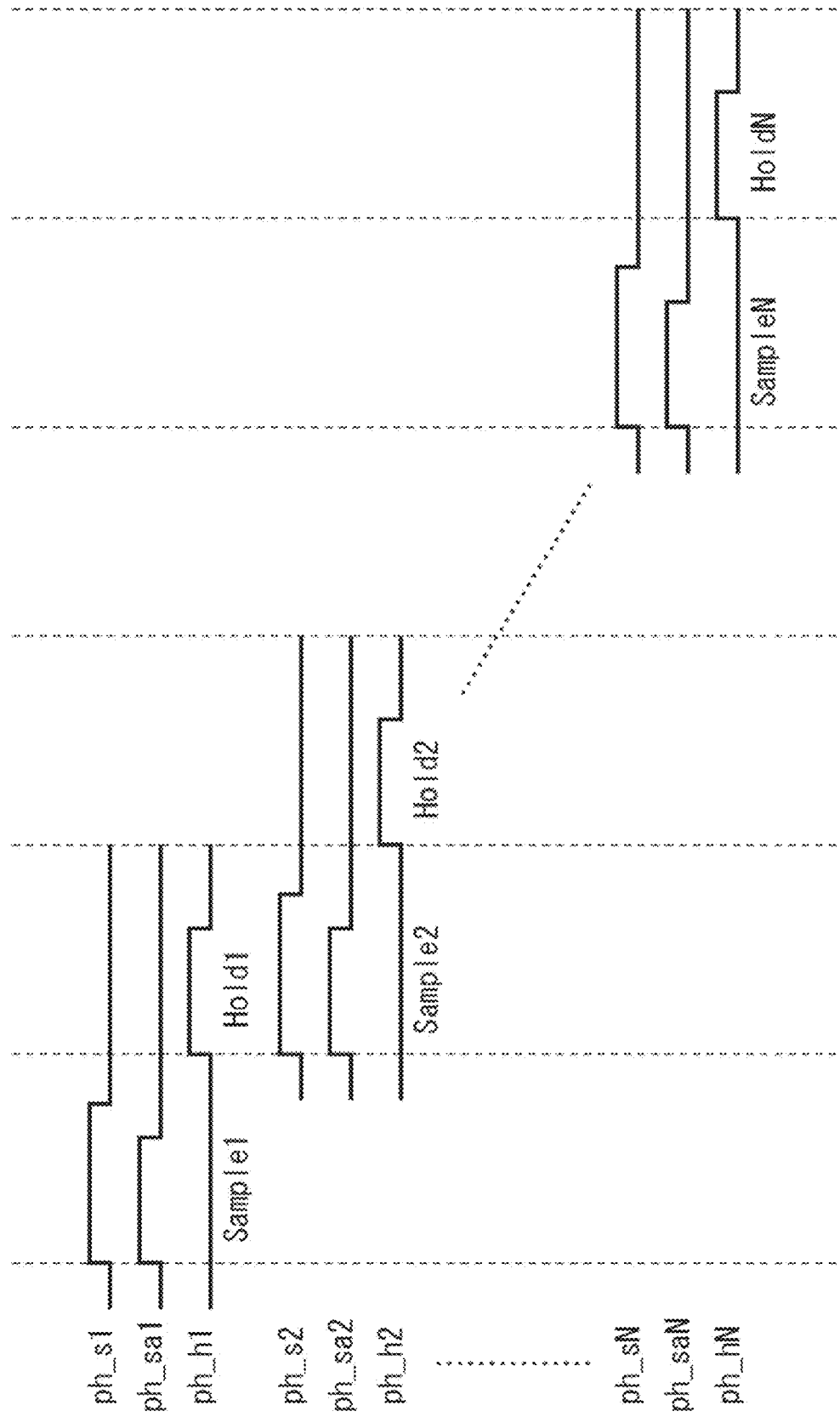
FIG. 8 is a timing chart illustrative of operation of the power supply noise canceler depicted in FIG. 7.

FIG. 7 depicts a configurational example of a power supply noise canceler 31c which is a third embodiment of the power supply noise canceler 31 depicted in FIG. 1. Note that those parts which correspond to those depicted in FIGS. 2 and 4 are denoted by identical reference symbols. In FIG. 7, only one unit pixel 51, sample and hold circuits 71a-1 through 71a-N included in a sample and hold section 15c (not depicted), and a power supply noise detector 14c are depicted for illustrative purposes. Moreover, some reference symbols are also omitted from illustration for illustrative purposes. Note that the reference symbols that denote various parts of the sample and hold circuits 71a-i (i=1 through N) are represented by the reference symbols that denote various parts of the sample and hold circuit 71a depicted in FIG. 2 with a suffix "i" or "-i" (i=1 through N).

The power supply noise canceler 31c includes the power supply noise detector 14c which is a third embodiment of the power supply noise detector 14 depicted in FIG. 1 and the sample and hold section 15c (not depicted) which is a third embodiment of the sample and hold section 15 depicted in FIG. 1. The sample and hold section 15c includes a plurality of sample and hold circuits 71a (FIG. 2).

The power supply noise detector 14c is different from the power supply noise detector 14a depicted in FIG. 4 in that it includes additional switches 301-1 through 301-N, buffer amplifiers 302-1 through 302-N, and capacitors Cs1 through CsN, and is devoid of the buffer amplifier 152.

The inputs of the buffer amplifiers 302-1 through 302-N are connected to the output of the power supply noise detecting circuit 151a through the respective switches 301-1 through 301-N. The capacitors Csi (i=1 through N) have ends connected between the switches 301-i and the buffer amplifiers 302-i and other ends thereof connected to ground. The outputs of the buffer amplifiers 302-1 through 302-N are connected to the respective switches 102-1 through 102-N of the sample and hold circuits 71a-1 through 71a-N. The vertical signal line 19 is connected to the switches 101-1 through 101-N of the sample and hold circuits 71a-1 through 71a-N.

Note that the sample and hold circuits 71a-1 through 71a-N will hereinafter be referred to simply as sample and hold circuit(s) 71a insofar as they do not need to be distinguished from each other.

The switches 101-i and 102-i and the switches 301-i (i=1 through N) are turned on when respective sample signals ph_si (i=1 through N) supplied from the timing control circuit 12 are on, and turned off when the sample signals ph_si are off.

The switches 103-i and 104-i (i=1 through N) are turned on when respective hold signals ph_hi supplied from the timing control circuit 12 are on, and turned off when the hold signals ph_hi are off.

The switches 105-i (i=1 through N) are turned on when respective sample signals ph_sai (i=1 through N) supplied from the timing control circuit 12 are on, and turned off when the sample signals ph_sai are off.

{Operation of the Power Supply Noise Canceler 31c}

Next, operation of the power supply noise canceler 31c will be described below with reference to a timing chart depicted in FIG. 8. The timing chart depicted in FIG. 8 represents the sample signals ph_s1 through ph_sN, the sample signals ph_sa1 through ph_saN, and the hold signals ph_h1 through ph_hN.

First, the sample signal ph_s1 and the sample signal ph_sa1 go on, turning on the switches 101-1, 102-1, and 105-1 of the sample and hold circuit 71a-1 and the switch 301-1, and a sampling period 1 starts. Accordingly, the pixel signal of the unit pixel 51 in the first row is now supplied through the switch 101-1 to the sampling capacitance Cvsl1 of the sample and hold circuit 71a-1, charging the sampling capacitance Cvsl1. In addition, the canceling signal from the power supply noise detecting circuit 151a is supplied through the switch 301-1, the buffer amplifier 302-1, and the switch 102-1 to the sampling capacitance Cpsr1 of the sample and hold circuit 71a-1, charging the sampling capacitance Cpsr1.

Then, after the sample signal ph_sa1 goes off, turning off the switch 105-1, the sample signal ph_s1 goes off, turning off the switches 101-1, 102-1, and 301-1, and the sampling period 1 is terminated.

Next, the hold signal ph_h1 goes on, turning on the switches 103-1 and 104-1 of the sample and hold circuit 71a-1, and a holding period 1 starts. Thus, as described above, a voltage VoutA1 representing the pixel signal of the unit pixel 51 in the first row from which a power supply noise component has been removed is output from the sample and hold circuit 71a-1.

Furthermore, at the same time that the hold signal ph_h1 goes on, the sample signal ph_s2 and the sample signal ph_sa2 go on, turning on the switches 101-2, 102-2, and 105-2 of the sample and hold circuit 71a-2 and the switch 301-2, and a sampling period 2 starts. Thus, the pixel signal of the unit pixel 51 in the second row is supplied through the switch 101-2 to the sampling capacitance Cvsl2 of the sample and hold circuit 71a-2, charging the sampling capacitance Cvsl2. Furthermore, the canceling signal from the power supply noise detecting circuit 151a is supplied through the switch 301-2, the buffer amplifier 302-2, and the switch 102-2 to the sampling capacitance Cpsr2 of the sample and hold circuit 71a-2, charging the sampling capacitance Cpsr2.

In this manner, the process of holding the pixel signal of the unit pixel 51 in the first row and the process of sampling of the unit pixel 51 in the second row are performed parallel to each other.

Then, the hold signal ph_h1 goes off, turning off the switches 103-1 and 104-1, and the holding period 1 is terminated. Furthermore, after the sample signal ph_sa2 goes off, turning off the switch 105-2, the sample signal ph_s2 goes off, turning off the switches 101-2, 102-2, and 301-2, and the sampling period 2 is terminated.

Next, the hold signal ph_h2 goes on, turning on the switches 103-2 and 104-2 of the sample and hold circuit 71a-2, and a holding period 2 starts. Thus, as described above, a voltage VoutA2 representing the pixel signal of the unit pixel 51 in the second row from which a power supply noise component has been removed is output from the sample and hold circuit 71a-2.

Furthermore, at the same time that the hold signal ph_h2 goes on, the sample signal ph_s3 and the sample signal ph_sa3 go on, turning on the switches 101-3, 102-3, and 105-3 of the sample and hold circuit 71a-3 and the switch 301-3, and a sampling period 3 starts. Thus, the pixel signal of the unit pixel 51 in the third row is supplied through the switch 101-3 to the sampling capacitance Cvsl3 of the sample and hold circuit 71a-3, charging the sampling capacitance Cvsl3. Furthermore, the canceling signal from the power supply noise detecting circuit 151a is supplied through the switch 301-3, the buffer amplifier 302-3, and the switch 102-3 to the sampling capacitance Cpsr3 of the sample and hold circuit 71a-3, charging the sampling capacitance Cpsr3.

In this manner, the process of holding the pixel signal of the unit pixel 51 in the second row and the process of sampling of the unit pixel 51 in the third row are performed parallel to each other.

Then, the hold signal ph_h2 goes off, turning off the switches 103-2 and 104-2, and the holding period 2 is terminated. Furthermore, after the sample signal ph_sa3 goes off, turning off the switch 105-3, the sample signal ph_s3 goes off, turning off the switches 101-3, 102-3, and 301-3, and the sampling period 3 is terminated.

Thereafter, similarly, the holding periods i−1 for the pixel signals of the unit pixels 51 in the (i−1)th rows and the sampling periods i for the pixel signals of the unit pixels 51 in the ith rows (i=2 through N) take place parallel to each other. Furthermore, after the holding period N−1 for the pixel signal of the unit pixel 51 in the (N−1)th row and the sampling period N for the pixel signal of the unit pixel 51 in the Nth row are terminated, the holding period N for the pixel signal of the unit pixel 51 in the Nth row and the sampling period 1 for the pixel signal of the unit pixel 51 in the first row take place parallel to each other. Subsequently, the holding periods i−1 for the pixel signals of the unit pixels 51 in the (i−1)th rows and the sampling periods i for the pixel signals of the unit pixels 51 in the ith rows take place parallel to each other.

By thus making the sampling periods and the holding periods take place parallel to each other, a sample and hold process can be performed at a high speed.

Here, the buffer amplifiers 302-1 through 302-N that are provided keep the power supply noise detecting circuit 151a and each sample and hold circuit 71a isolated from each other. Furthermore, the capacitors Cs1 through CsN that are provided prevent the buffer amplifiers 302-1 through 302-N from going into a floating state when the switches 301-1 through 301-N are turned off.

Note that the buffer amplifiers 302-1 through 302-N and the capacitors Cs1 through CsN may be dispensed with. Whether the buffer amplifiers 302-1 through 302-N and the capacitors Cs1 through CsN are to be provided or not is determined by the required accuracy of pixel signals.

<5. Fourth Embodiment>

Next, a fourth embodiment of the present technology will be described below with reference to FIG. 9.

{Fourth Embodiment of the Power Supply Noise Canceler 31}

Figure 9:
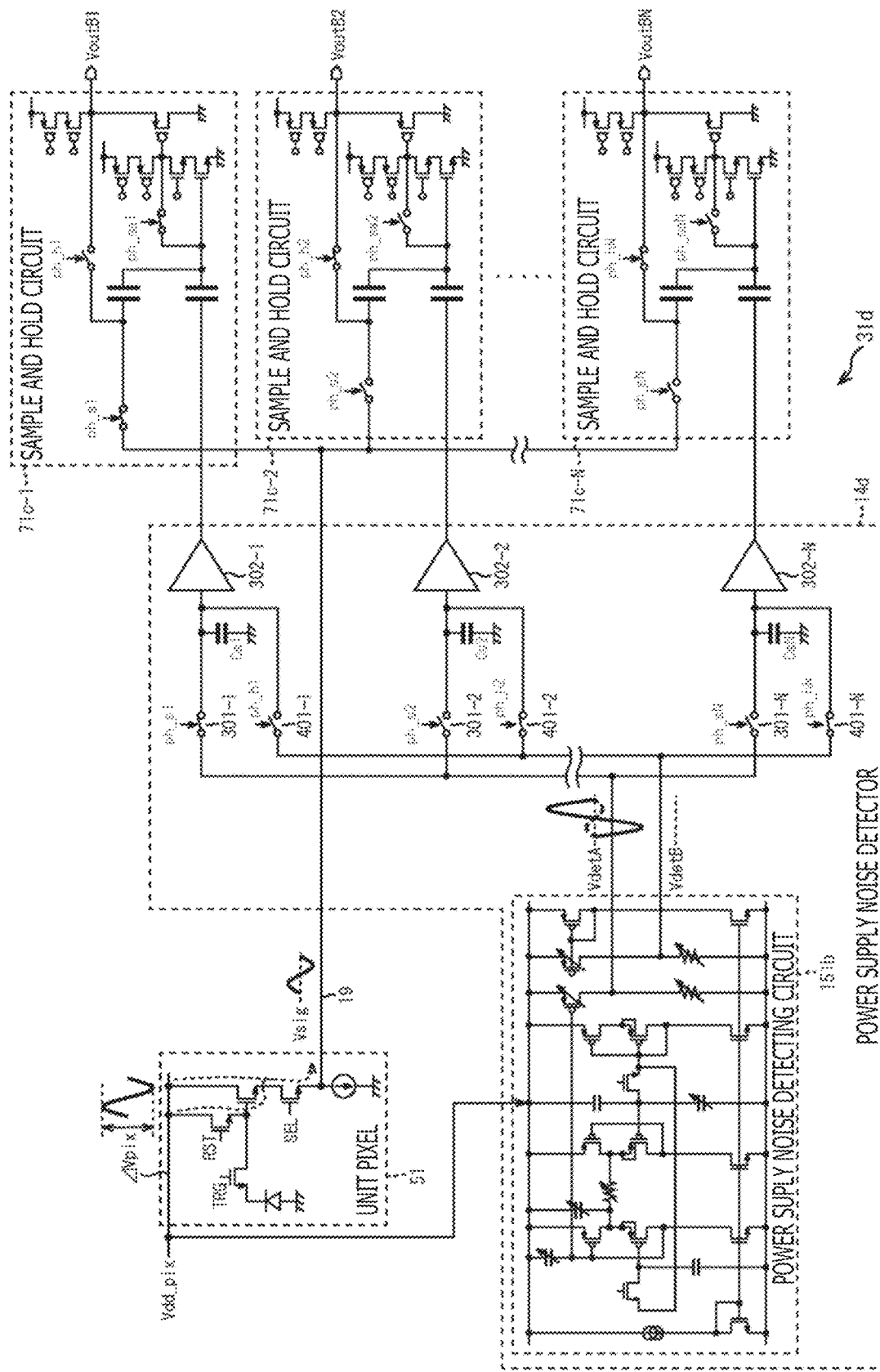
FIG. 9 is a circuit diagram depicting a fourth embodiment of the power supply noise canceler.

FIG. 9 depicts a configurational example of a power supply noise canceler 31d which is a fourth embodiment of the power supply noise canceler 31 depicted in FIG. 1. Note that those parts which correspond to those depicted in FIG. 7 are denoted by identical reference symbols. In addition, in FIG. 9, only one unit pixel 51, sample and hold circuits 71c-1 through 71c-N included in a sample and hold section 15d (not depicted), and a power supply noise detector 14d are depicted for illustrative purposes. Moreover, some reference symbols are also omitted from illustration for illustrative purposes. Note that the reference symbols that denote various parts of the sample and hold circuits 71c-i (i=1 through N) are represented by the reference symbols that denote various parts of the sample and hold circuit 71b depicted in FIG. 4 with a suffix "i" or "-i" (i=1 through N).

The power supply noise canceler 31d is different from the power supply noise canceler 31c depicted in FIG. 7 in that it includes a power supply noise detector 14d and a sample and hold section 15d (not depicted), instead of the power supply noise detector 14c and the sample and hold section 15c. The sample and hold section 15d includes a plurality of sample and hold circuits 71c.

The power supply noise detector 14d is different from the power supply noise detector 14c in that it includes the power supply noise detecting circuit 151b depicted in FIG. 6 instead of the power supply noise detecting circuit 151a, and includes additional switches 401-1 through 401-N.

The output section of the power supply noise detecting circuit 151b for outputting the canceling signal is connected to the inputs of the buffer amplifiers 302-1 through 302-N through the switches 301-1 through 301-N. Furthermore, the output section of the power supply noise detecting circuit 151b for outputting the reference signal is connected between the capacitors Cs1 through CsN and the inputs of the buffer amplifiers 302-1 through 302-N through the switches 401-1 through 401-N.

The sample and hold circuits 71c-1 through 71c-N are of a structure similar to the sample and hold circuit 71b depicted in FIG. 5 except that the switch 102 and the switch 201 are dispensed with.

Then, the outputs of the buffer amplifiers 302-1 through 302-N of the power supply noise detector 14d are connected to respective ends of the capacitors Cpsr1 through CpsrN of the sample and hold circuits 71c-1 through 71c-N. The vertical signal line 19 is connected to the switches 101-1 through 101-N of the sample and hold circuits 71a-1 through 71a-N.

The switches 401-i (i=1 through N) are turned on when respective hold signals ph_hi supplied from the timing control circuit 12 are on, and turned off when the hold signals ph_hi are off.

Note that the sample and hold circuits 71c-1 through 71c-N will hereinafter be referred to simply as sample and hold circuit(s) 71c insofar as they do not need to be distinguished from each other.

{Operation of the Power Supply Noise Canceler 31d}

Next, operation of the power supply noise canceler 31d will be described below. The power supply noise canceler 31d operates according to the timing chart depicted earlier in FIG. 8.

First, the sample signal ph_s1 and the sample signal ph_sa1 go on, turning on the switches 101-1 and 105-1 of the sample and hold circuit 71c-1 and the switch 301-1, and a sampling period 1 starts. Thus, the pixel signal of the unit pixel 51 in the first row is now supplied through the switch 101-1 to the sampling capacitance Cvsl1 of the sample and hold circuit 71c-1, charging the sampling capacitance Cvsl1. Furthermore, the canceling signal from the power supply noise detecting circuit 151b is supplied through the switch 301-1 and the buffer amplifier 302-1 to the sampling capacitance Cpsr1 of the sample and hold circuit 71c-1, charging the sampling capacitance Cpsr1.

Then, after the sample signal ph_sa1 goes off, turning off the switch 105-1, the sample signal ph_s1 goes off, turning off the switches 101-1 and 301-1, and the sampling period 1 is terminated.

Next, the hold signal ph_h1 goes on, turning on the switches 104-1 of the sample and hold circuit 71c-1 and the switch 401-1, and a holding period 1 starts. Thus, as described above, a voltage VoutB1 representing the pixel signal of the unit pixel 51 in the first row from which a power supply noise component has been removed is output from the sample and hold circuit 71c-1.

In addition, at the same time that the hold signal ph_h1 goes on, the sample signal ph_s2 and the sample signal ph_sa2 go on, turning on the switches 101-2 and 105-2 of the sample and hold circuit 71c-2 and the switch 301-2, and a sampling period 2 starts. Thus, the pixel signal of the unit pixel 51 in the second row is supplied through the switch 101-2 to the sampling capacitance Cvsl2 of the sample and hold circuit 71c-2, charging the sampling capacitance Cvsl2. Furthermore, the canceling signal from the power supply noise detecting circuit 151b is supplied through the switch 301-2 and the buffer amplifier 302-2 to the sampling capacitance Cpsr2 of the sample and hold circuit 71c-2, charging the sampling capacitance Cpsr2.

In this manner, the process of holding the pixel signal of the unit pixel 51 in the first row and the process of sampling of the unit pixel 51 in the second row are performed parallel to each other.

Then, the hold signal ph_h1 goes off, turning off the switches 104-1 and 401-1, and the holding period 1 is terminated. Furthermore, after the sample signal ph_sa2 goes off, turning off the switch 105-2, the sample signal ph_s2 goes off, turning off the switches 101-2 and 301-2, and the sampling period 2 is terminated.

Next, the hold signal ph_h2 goes on, turning on the switches 104-2 of the sample and hold circuit 71c-2 and the switch 401-2, and a holding period 2 starts. Thus, as described above, a voltage VoutB2 representing the pixel signal of the unit pixel 51 in the second row from which a power supply noise component has been removed is output from the sample and hold circuit 71c-2.

Furthermore, at the same time that the hold signal ph_h2 goes on, the sample signal ph_s3 and the sample signal ph_sa3 go on, turning on the switches 101-3 and 105-3 of the sample and hold circuit 71c-3 and the switch 301-3, and a sampling period 3 starts. Thus, the pixel signal of the unit pixel 51 in the third row is supplied through the switch 101-3 to the sampling capacitance Cvsl3 of the sample and hold circuit 71c-3, charging the sampling capacitance Cvsl3. Furthermore, the canceling signal from the power supply noise detecting circuit 151b is supplied through the switch 301-3 and the buffer amplifier 302-3 to the sampling capacitance Cpsr3 of the sample and hold circuit 71c-3, charging the sampling capacitance Cpsr3.

In this manner, the process of holding the pixel signal of the unit pixel 51 in the second row and the process of sampling of the unit pixel 51 in the third row are performed parallel to each other.

Then, the hold signal ph_h2 goes off, turning off the switches 104-2 and 401-2 and the holding period 2 is terminated. Furthermore, after the sample signal ph_sa3 goes off, turning off the switch 105-3, the sample signal ph_s3 goes off, turning off the switches 101-3 and 301-3, and the sampling period 3 is terminated.

Thereafter, similarly, the holding periods i−1 for the pixel signals of the unit pixels 51 in the (i−1)th rows and the sampling periods i for the pixel signals of the unit pixels 51 in the ith rows (i=2 through N) take place parallel to each other. Furthermore, after the holding period N−1 for the pixel signal of the unit pixel 51 in the (N−1)th row and the sampling period N for the pixel signal of the unit pixel 51 in the Nth row are terminated, the holding period N for the pixel signal of the unit pixel 51 in the Nth row and the sampling period 1 for the pixel signal of the unit pixel 51 in the first row take place parallel to each other. Subsequently, the holding periods i−1 for the pixel signals of the unit pixels 51 in the (i−1)th rows and the sampling periods i for the pixel signals of the unit pixels 51 in the ith rows take place parallel to each other.

By thus making the sampling periods and the holding periods take place parallel to each other, a sample and hold process can be performed at a high speed.

Here, the buffer amplifiers 302-1 through 302-N that are provided keep the power supply noise detecting circuit 151b and each sample and hold circuit 71c isolated from each other. Furthermore, the capacitors Cs1 through CsN that are provided prevent the buffer amplifiers 302-1 through 302-N from going into a floating state when the switches 301-1 through 301-N and the switches 401-1 through 401-N are turned off.

Note that the buffer amplifiers 302-1 through 302-N and the capacitors Cs1 through CsN may be dispensed with. Whether the buffer amplifiers 302-1 through 302-N and the capacitors Cs1 through CsN are to be provided or not is determined by the required accuracy of pixel signals.

<6. Fifth Embodiment>

Next, a fifth embodiment of the present technology will be described below with reference to FIGS. 10 and 11. According to the fifth embodiment, the sample and hold circuit 71a depicted in FIG. 2 is applied to the reset potential and image signal potential of pixel signals for performing CDS (Correlated Double Sampling).

{Fifth Embodiment of the Power Supply Noise Canceler 31}

Figure 10:
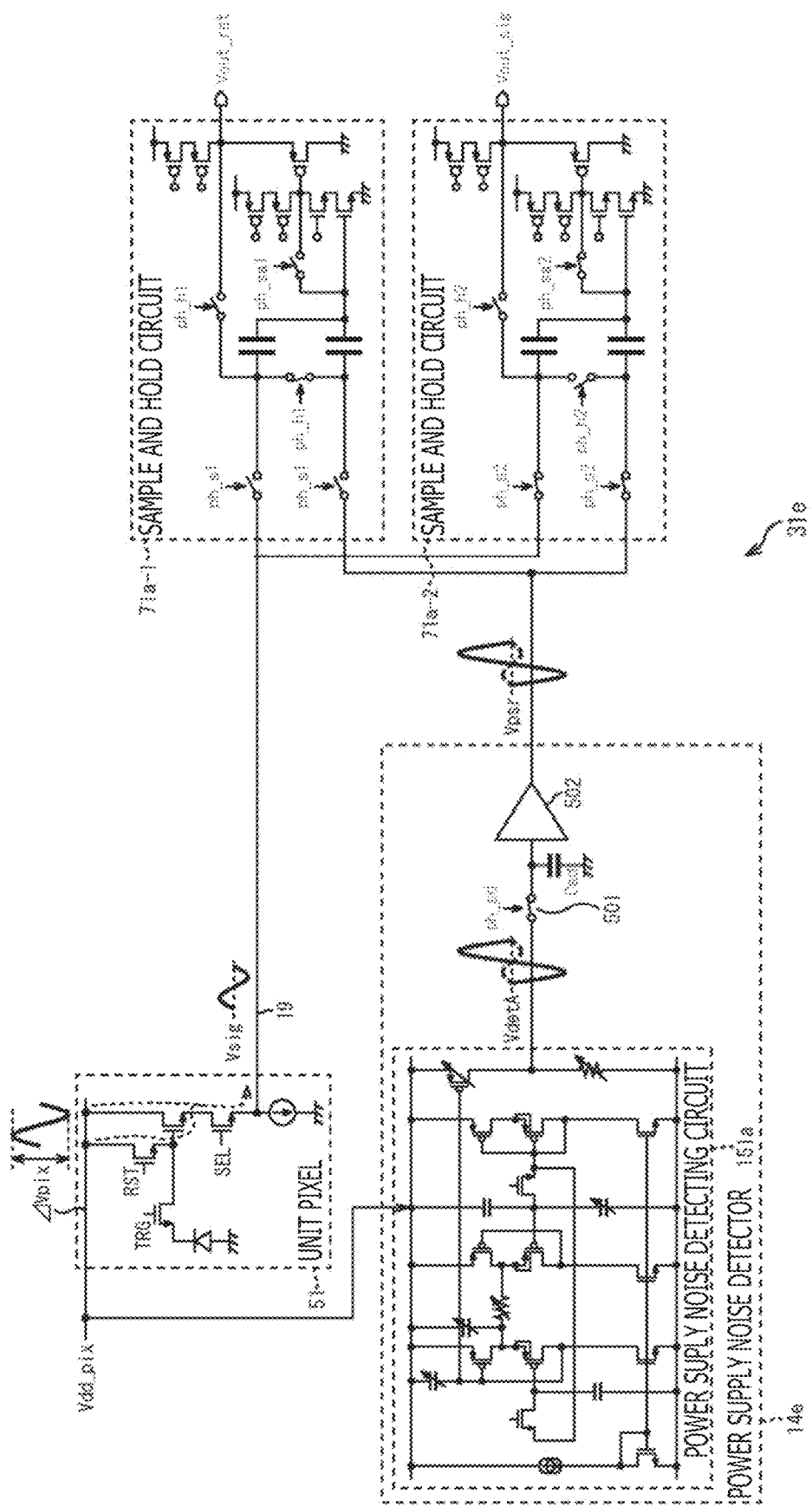
FIG. 10 is a circuit diagram depicting a fifth embodiment of the power supply noise canceler.
Figure 11:
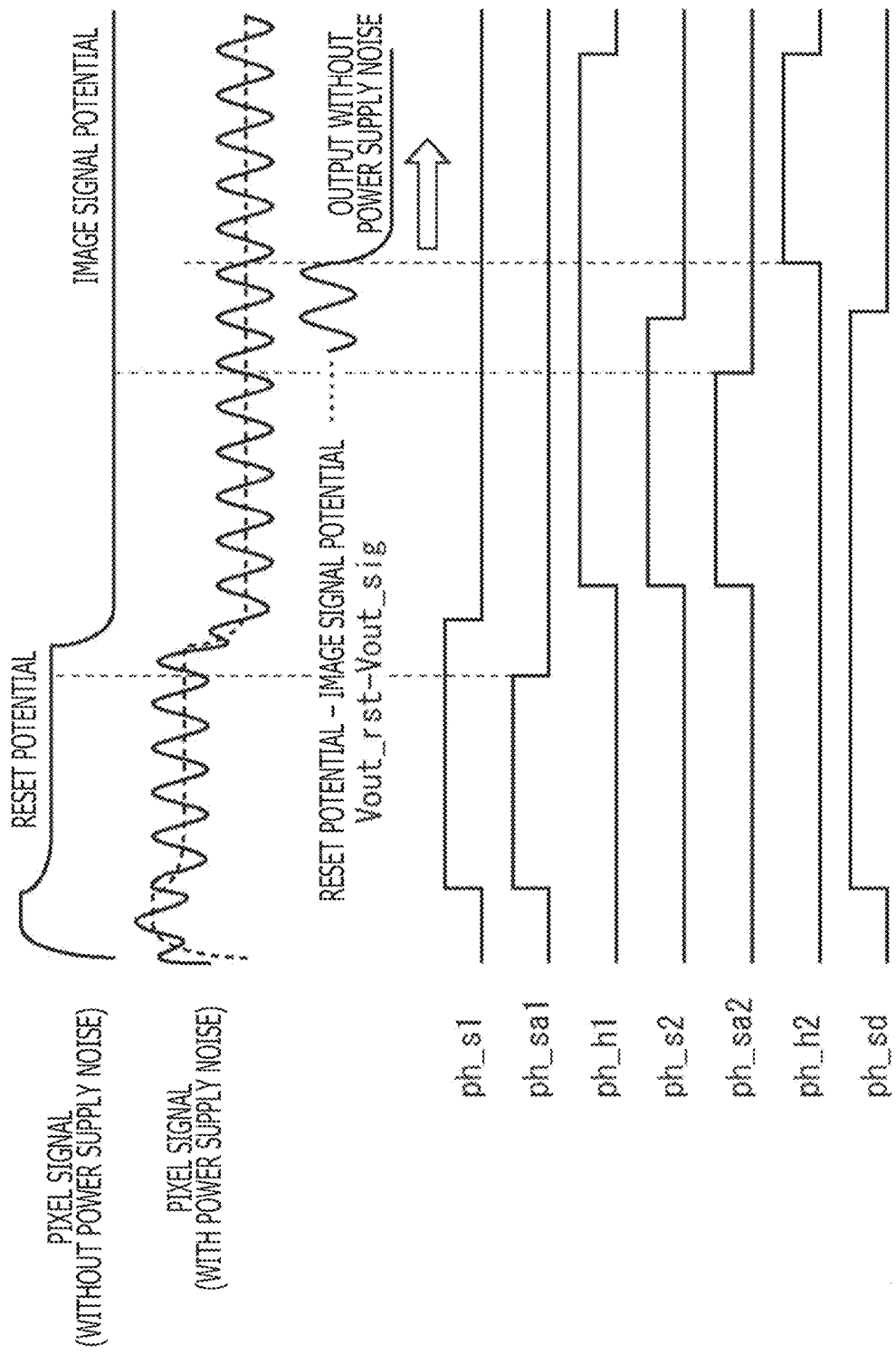
FIG. 11 is a timing chart illustrative of operation of the power supply noise canceler depicted in FIG. 10.

FIG. 10 depicts a configurational example of a power supply noise canceler 31e which is a fifth embodiment of the power supply noise canceler 31 depicted in FIG. 1. Note that those parts which correspond to those depicted in FIGS. 2 and 4 are denoted by identical reference symbols. Furthermore, in FIG. 10, only one unit pixel 51, sample and hold circuits 71a-1 and 71a-2 included in a sample and hold section 15e (not depicted), and a power supply noise detector 14e are depicted for illustrative purposes. Moreover, some reference symbols are also omitted from illustration for illustrative purposes. Note that the reference symbols that denote various parts of the sample and hold circuits 71a-i (i=1 or 2) are represented by the reference symbols that denote various parts of the sample and hold circuit 71a depicted in FIG. 2 with a suffix "i" or "-i."

The power supply noise canceler 31e includes the power supply noise detector 14e which is a fifth embodiment of the power supply noise detector 14 depicted in FIG. 1 and the sample and hold section 15e (not depicted) which is a fifth embodiment of the sample and hold section 15 depicted in FIG. 1. The sample and hold section 15e includes a plurality of sample and hold circuits 71a (FIG. 2).

The power supply noise detector 14e is different from the power supply noise detector 14a depicted in FIG. 4 in that it includes an additional switch 501, an additional buffer amplifier 502-1, and an additional capacitor Csd, and is devoid of the buffer amplifier 152.

The input of the buffer amplifier 502 is connected to the output of the power supply noise detecting circuit 151a through the switch 501. One end of the capacitor Csd is connected between the switch 501 and the buffer amplifier 502, and the other end thereof is connected to ground. The output of the buffer amplifier 502 is connected to the switches 102-1 and 102-2 of the sample and hold circuits 71a-1 and 71a-2. The vertical signal line 19 is connected to the switches 101-1 and 101-2 of the sample and hold circuits 71a-1 and 71a-2.

The switches 101-i and 102-i (i=1 or 2) are turned on when the sample signal ph_si supplied from the timing control circuit 12 is on, and turned off when the sample signal ph_si is off.

The switches 103-i and 104-i (i=1 or 2) are turned on when the hold signal ph_hi supplied from the timing control circuit 12 is on, and turned off when the hold signal ph_hi is off.

The switch 105-i (i=1 or 2) is turned on when the sample signal ph_sai supplied from the timing control circuit 12 is on, and turned off when the sample signal ph_sai is off.

The switch 501 is turned on when a sample signal ph_sd supplied from the timing control circuit 12 is on, and turned off when the sample signal ph_sd is off.

{Operation of the Power Supply Noise Canceler 31e}

Next, operation of the power supply noise canceler 31e will be described below with reference to a timing chart depicted in FIG. 11. The timing chart depicted in FIG. 11 represents the sample signals ph_s1 and ph_s2, the sample signals ph_sa1 and ph_sa2, the hold signals ph_h1 and ph_h2, and the sample signal ph_sd.

First, when the pixel signal of the unit pixel 51 is of a reset potential, the sample signals ph_s1 and ph_sa1 go on, turning on the switches 101-1, 102-1, and 105-1 of the sample and hold circuit 71a-1. Moreover, the sample signal ph_sd goes on, turning on the switch 501. Thus, the pixel signal of the reset potential (hereinafter referred to as reset signal) starts its sampling period.

Then, the reset signal of the unit pixel 51 is supplied through the switch 101-1 to the sampling capacitance Cvsl1 of the sample and hold circuit 71a-1, charging the sampling capacitance Cvsl1. Furthermore, the canceling signal from the power supply noise detecting circuit 151a is supplied through the switch 501, the buffer amplifier 502, and the switch 102-1 to the sampling capacitance Cpsr1 of the sample and hold circuit 71a-1, charging the sampling capacitance Cpsr1.

Then, after the sample signal ph_sa1 goes off, turning off the switch 105-1, the sample signal ph_s1 goes off, turning off the switches 101-1 and 102-1, and the sampling period of the reset signal is terminated.

Next, when the pixel signal of the unit pixel 51 is of an image signal potential, the sample signals ph_s2 and ph_sa2 go on, turning on the switches 101-2, 102-2, and 105-2 of the sample and hold circuit 71a-2. Thus, the pixel signal of the image signal potential (hereinafter referred to as image signal) starts its sampling period.

Then, the image signal of the unit pixel 51 is supplied through the switch 101-2 to the sampling capacitance Cvsl2 of the sample and hold circuit 71a-2, charging the sampling capacitance Cvsl2. Furthermore, the canceling signal from the power supply noise detecting circuit 151a is supplied through the switch 501, the buffer amplifier 502, and the switch 102-2 to the sampling capacitance Cpsr2 of the sample and hold circuit 71a-2, charging the sampling capacitance Cpsr2.

Furthermore, at the same time that the sample signal ph_s2 and the sample signal ph_sa2 go on, the hold signal ph_h1 goes on, turning on the switches 103-1 and 104-1 of the sample and hold circuit 71a-1, and the reset signal starts its holding period. Thus, as described above, a voltage Vout_rst representing the reset signal of the unit pixel 51 from which a power supply noise component has been removed is output from the sample and hold circuit 71a-1.

Then, after the sample signal ph_sa2 goes off, turning off the switch 105-2, the sample signal ph_s2 goes off, turning off the switches 101-2 and 102-2, and the sampling period of the image signal is terminated.

Furthermore, when the sample signal ph_s2 goes off, the sample signal ph_sd goes off, turning off the switch 501.

Next, the hold signal ph_h2 goes on, turning on the switches 103-2 and 104-2 of the sample and hold circuit 71a-2, and the image signal starts its holding period. Thus, as described above, a voltage Vout_sig representing the image signal of the unit pixel 51 from which a power supply noise component has been removed is output from the sample and hold circuit 71a-2.

Then, the A/D converter 16, for example, calculates the reset voltage Vout_rst−the image signal Vout_sig, thereby removing reset noise and fixed pattern noise inherent in the pixel such as a threshold variation of the amplifying transistor in the pixel, etc. from the pixel signal.

Thereafter, hold signals phi, ph2 go off, turning off the switches 103-1, 103-2, 104-1, and 104-2, and the holding periods of the reset signal and the image signal are terminated.

Note that the sample signal ph_sd needs to go off at the same time that the sample signal ph_s2 goes off or during a period after the sample signal ph_s2 goes off and before the hold signal ph_h2 goes on. This is to prevent the canceling signal from leaking in through a parasitic capacitance, etc. from the power supply noise detecting circuit 151a while both the hold signals ph_h1 and ph_h2 go on and signals from which a power supply noise component has been removed are output from the sample and hold circuits 71a-1 and 71a-2. If there is no concern about the leaking-in of the canceling signal, the sample signal ph_sd may be left on.

<7. Sixth Embodiment>

Next, a sixth embodiment of the present technology will be described below with reference to FIGS. 12 and 13. According to the sixth embodiment, the sample and hold circuit 71c depicted in FIG. 9 is applied to the reset potential and image signal potential of pixel signals for performing CDS (Correlated Double Sampling).

{Sixth Embodiment of the Power Supply Noise Canceler 31}

Figure 12:
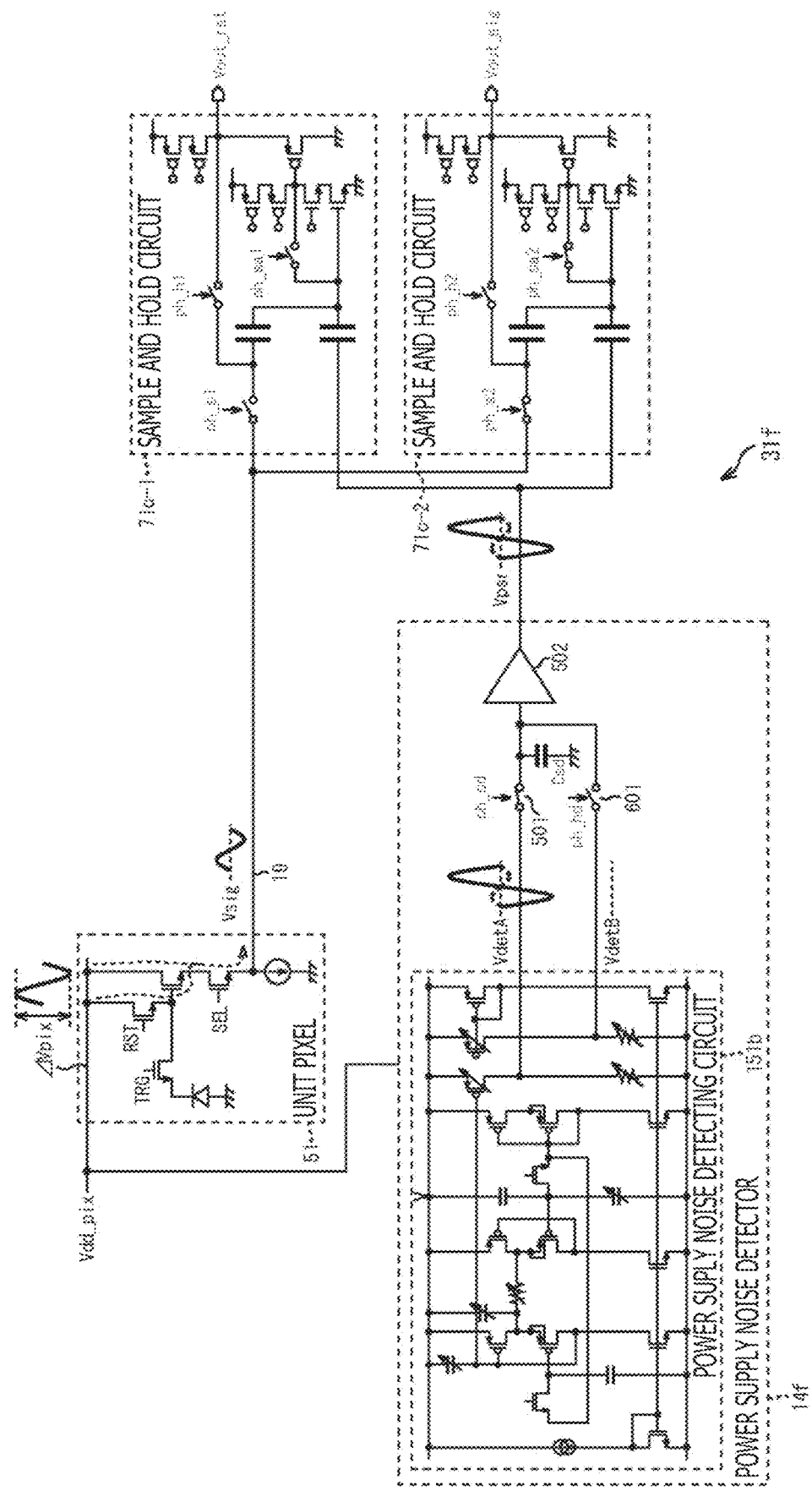
FIG. 12 is a circuit diagram depicting a sixth embodiment of the power supply noise canceler.
Figure 13:
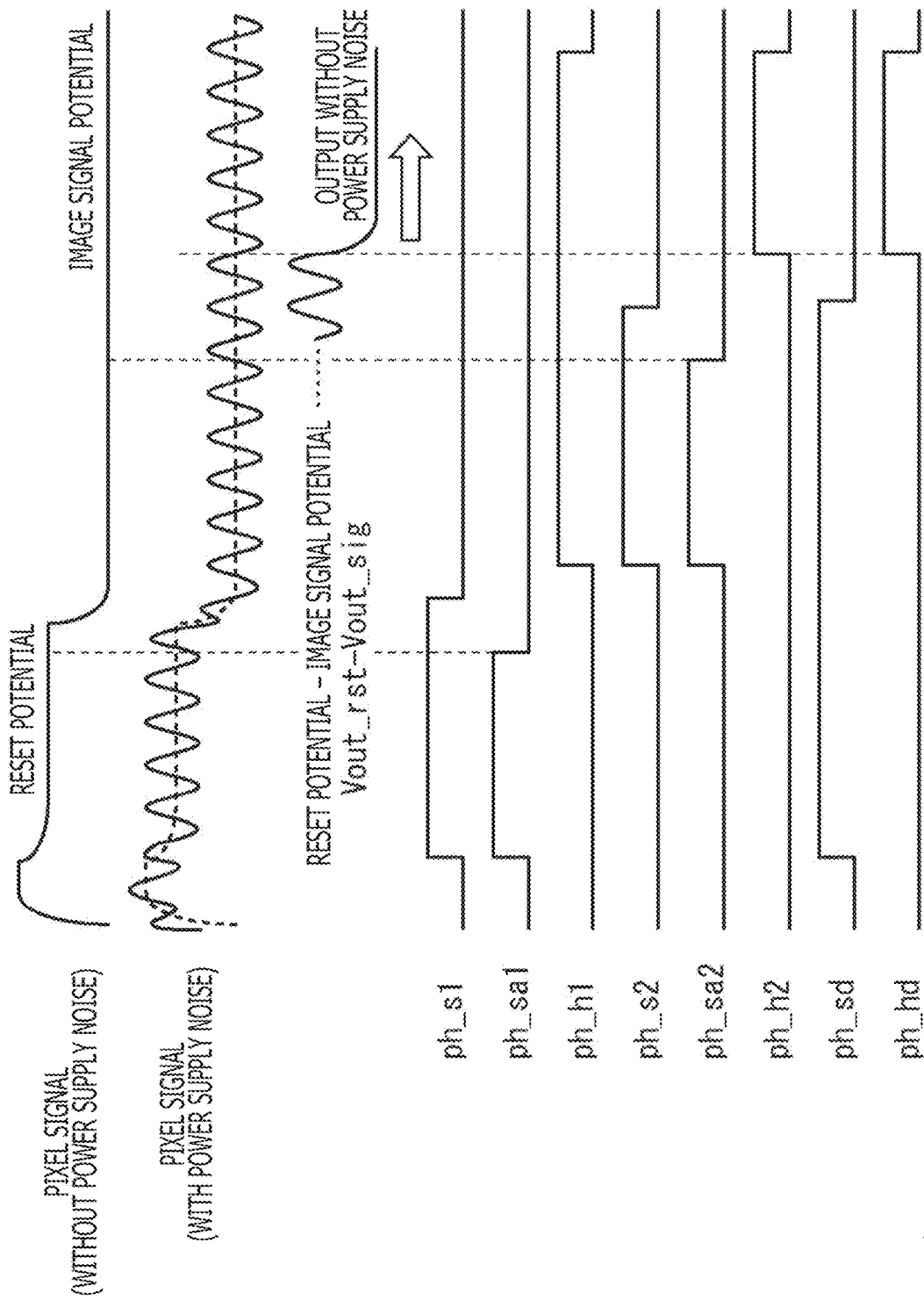
FIG. 13 is a timing chart illustrative of operation of the power supply noise canceler depicted in FIG. 12.

FIG. 12 depicts a configurational example of a power supply noise canceler 31f which is a sixth embodiment of the power supply noise canceler 31 depicted in FIG. 1. Note that those parts which correspond to those depicted in FIG. 10 are denoted by identical reference symbols. In addition, in FIG. 12, only one unit pixel 51, sample and hold circuits 71c-1 and 71c-2 included in a sample and hold section 15f (not depicted), and a power supply noise detector 14f are depicted for illustrative purposes. Moreover, some reference symbols are also omitted from illustration for illustrative purposes. Note that the reference symbols that denote various parts of the sample and hold circuits 71c-i (i=1 or 2) are represented by the reference symbols that denote various corresponding parts of the sample and hold circuit 71b depicted in FIG. 5 with a suffix "i" or "-i."

The power supply noise canceler 31f includes the power supply noise detector 14f which is a sixth embodiment of the power supply noise detector 14 depicted in FIG. 1 and the sample and hold section 15f (not depicted) which is a sixth embodiment of the sample and hold section 15 depicted in FIG. 1. The sample and hold section 15f includes a plurality of sample and hold circuits 71c (FIG. 9).

The power supply noise detector 14f is different from the power supply noise detector 14e depicted in FIG. 10 in that it includes an additional switch 601 and the power supply noise detecting circuit 151b depicted in FIG. 6 instead of the power supply noise detecting circuit 151a.

The output section of the power supply noise detecting circuit 151b for outputting the canceling signal is connected to the input of the buffer amplifier 502 through the switch 501. Furthermore, the output section of the power supply noise detecting circuit 151b for outputting the bias voltage is connected between the capacitor Cs3 and the input of the buffer amplifier 502 through the switch 601.

The output of the buffer amplifier 502 is connected to the sampling capacitances Cpsr1 and Cpsr2 of the sample and hold circuits 71c-1 and 71c-2. The vertical signal line 19 is connected to the switches 101-1 and 101-2 of the sample and hold circuits 71c-1 and 71c-2.

The switch 101-i (i=1 or 2) is turned on when the sample signal ph_si supplied from the timing control circuit 12 is on, and turned off when the sample signal ph_si is off.

The switch 104-i (i=1 or 2) is turned on when the hold signal ph_hi supplied from the timing control circuit 12 is on, and turned off when the hold signal ph_hi is off.

The switch 105-i (i=1 or 2) is turned on when the sample signal ph_sai supplied from the timing control circuit 12 is on, and turned off when the sample signal ph_sai is off.

The switch 501 is turned on when the sample signal ph_sd supplied from the timing control circuit 12 is on, and turned off when the sample signal ph_sd is off.

The switch 601 is turned on when the hold signal ph_hd supplied from the timing control circuit 12 is on, and turned off when the hold signal ph_hd is off.

{Operation of the Power Supply Noise Canceler 31f}

Next, operation of the power supply noise canceler 31f will be described below with reference to a timing chart depicted in FIG. 13. The timing chart depicted in FIG. 13 represents the sample signals ph_s1 and ph_s2, the sample signals ph_sa1 and ph_sa2, the hold signals ph_h1 and ph_h2, the sample signal ph_sd, and the hold signal ph_hd.

First, when the pixel signal of the unit pixel 51 is of a reset potential, the sample signals ph_s1 and ph_sa1 go on, turning on the switches 101-1 and 105-1 of the sample and hold circuit 71c-1. Moreover, the sample signal ph_sd goes on, turning on the switch 501. Thus, the reset signal now starts its sampling period.

Then, the reset signal of the unit pixel 51 is supplied through the switch 101-1 to the sampling capacitance Cvsl1 of the sample and hold circuit 71c-1, charging the sampling capacitance Cvsl1. Furthermore, the canceling signal from the power supply noise detecting circuit 151b is supplied through the switch 501 and the buffer amplifier 502 to the sampling capacitance Cpsr1 of the sample and hold circuit 71c-1, charging the sampling capacitance Cpsr1.

Then, after the sample signal ph_sa1 goes off, turning off the switch 105-1, the sample signal ph_s1 goes off, turning off the switch 101-1, and the sampling period of the reset signal is terminated.

Next, when the pixel signal of the unit pixel 51 is of an image signal potential, the sample signal ph_s2 and the sample signal ph_sa2 go on, turning on the switches 101-2 and 105-2 of the sample and hold circuit 71c-2. Thus, the image signal starts its sampling period.

Then, the image signal of the unit pixel 51 is supplied through the switch 101-2 to the sampling capacitance Cvsl1 of the sample and hold circuit 71c-2, charging the sampling capacitance Cvsl2. Furthermore, the canceling signal from the power supply noise detecting circuit 151b is supplied through the switch 501 and the buffer amplifier 502 to the sampling capacitance Cpsr2 of the sample and hold circuit 71c-2, charging the sampling capacitance Cpsr2.

Furthermore, at the same time that the sample signal ph_s2 and the sample signal ph_sa2 go on, the hold signal ph_h1 goes on, turning on the switch 104-1 of the sample and hold circuit 71c-1, and the reset signal starts its holding period.

Then, after the sample signal ph_sa2 goes off, turning off the switch 105-2, the sample signal ph_s2 goes off, turning off the switch 101-2, and the sampling period of the image signal is terminated.

Furthermore, when the sample signal ph_s2 goes off, the sample signal ph_sd goes off, turning off the switch 501.

Next, the hold signal ph_h2 goes on, turning on the switch 104-2 of the sample and hold circuit 71c-2, and the image signal starts its holding period. Moreover, simultaneously with the hold signal ph_h2, the hold signal ph_hd goes on, turning on the switch 601.

Thus, as described above, a voltage Vout_rst representing the reset signal of the unit pixel 51 from which a power supply noise component has been removed is output from the sample and hold circuit 71c-1. In addition, as described above, a voltage Vout_sig representing the image signal of the unit pixel 51 from which a power supply noise component has been removed is output from the sample and hold circuit 71c-2.

Then, the A/D converter 16, for example, calculates the reset voltage Vout_rst−the image voltage Vout_sig, thereby removing reset noise and fixed pattern noise inherent in the pixel such as a threshold variation of the amplifying transistor in the pixel, etc. from the pixel signal.

Thereafter, hold signals ph1, ph2, and ph_hd go off, turning off the switches 103-1, 103-2, 104-1, 104-2, and 601, and the holding periods of the reset signal and the image signal are terminated.

Note that the sample signal ph_sd needs to go off at the same time that the sample signal ph_s2 goes off or during a period after the sample signal ph_s2 goes off and before the hold signal ph_h2 goes on. This is because signals from which power supply noise has been removed are output from the sample and hold circuits 71c-1 and 71c-2 only after both the hold signals ph_h1 and ph_h2 go on, the sample signal ph_sd goes off, and the hold signal ph_hd goes on.

<8. Modifications>

The above embodiments have been described as being applied to CMOS image sensors having a matrix of unit pixels. However, the present technology is not limited to applications to CMOS image sensors. That is, the present technology is also applicable to a general range of XY-addressable solid-state imaging devices including a two-dimensional array of unit pixels.

In addition, the solid-state imaging device may be of a one-chip structure or a module structure having an imaging function in which an imaging section and a signal processor or an optical system are packaged together.

Furthermore, the range to which the present technology is applicable is not limited to solid-state imaging devices and circuits that deal with A/D conversion. The present technology is also applicable to measures for coping with power supply noise in a general range of sample and hold circuits for sampling and holding single-ended signals.

<9. Example Applied to an Electronic Device>

The above solid-state imaging device (e.g., the CMOS image sensor 10) can be used in electronic devices where a solid-state imaging device is incorporated in an image capturing section (photoelectric transducer), such as an image capturing device, e.g., a digital still camera, a video camera, etc., a mobile terminal device having an imaging function, and a copying machine that uses a solid-state imaging device in an image reader.

Figure 14:
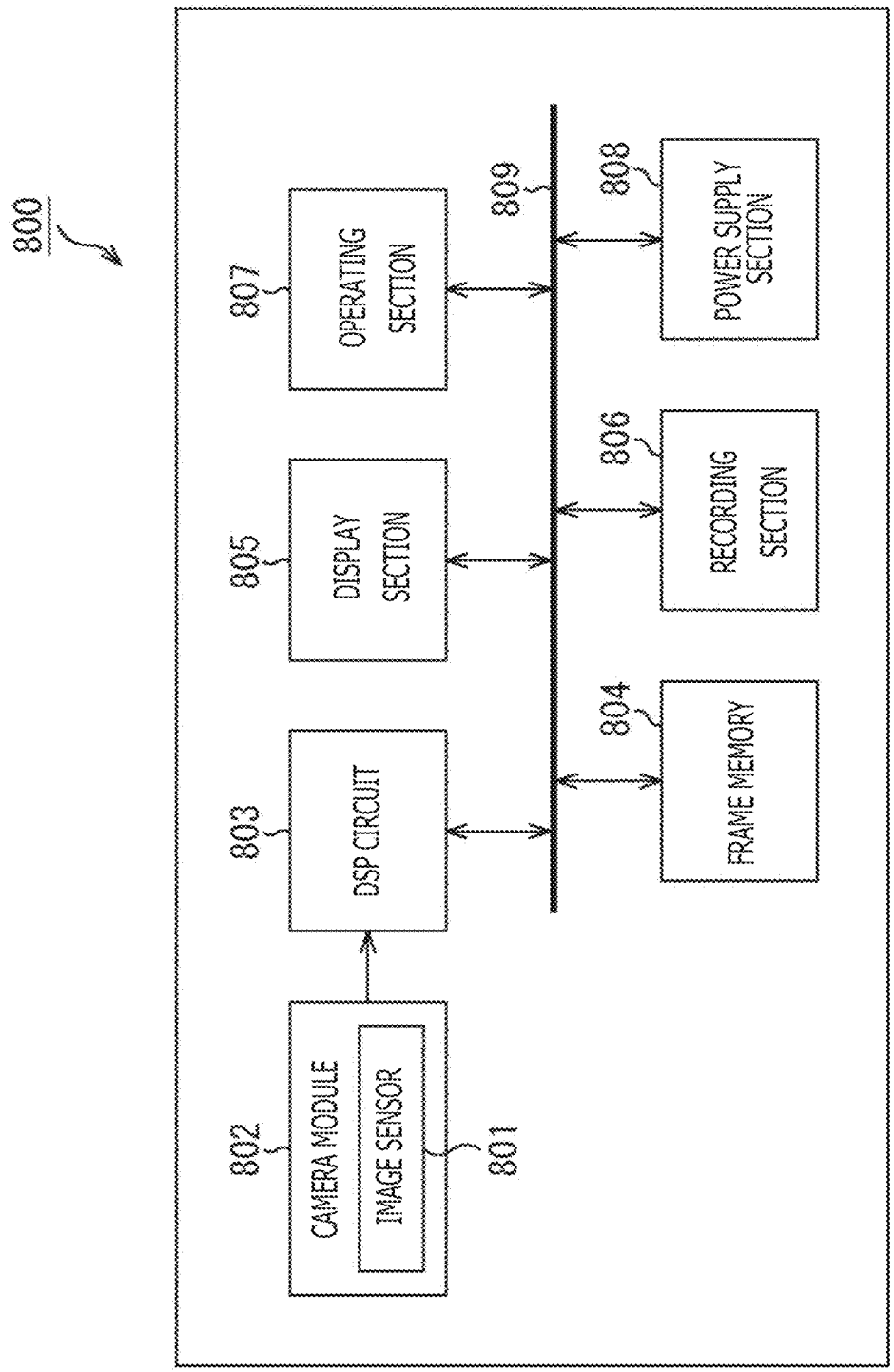
FIG. 14 is a block diagram depicting a configurational example of an electronic device.

FIG. 14 is a block diagram depicting a configurational example of an imaging device as an electronic device to which the present technology is applied.

The imaging device, denoted by 800, in FIG. 14 includes a camera module 802 and a DSP (Digital Signal Processor) circuit 803 which is a camera signal processing circuit. Further, the imaging device 800 also includes a frame memory 804, a display section 805, a recording section 806, an operating section 807, and a power supply section 808. The DSP circuit 803, the frame memory 804, the display section 805, the recording section 806, the operating section 807, and the power supply section 808 are connected to each other through a bus line 809.

The camera module 802 has an image sensor 801 included therein that captures incident light from a subject (image light), converts the amount of incident light focused on an imaging surface into an electric signal per pixel, and outputs the electric signal as a pixel signal. The solid-state imaging device described above may be employed as the image sensor 801, for example.

The display section 805 includes a panel-type display device such as a liquid crystal panel, an organic EL (ElectroLuminescence) panel, or the like, and displays a moving image or still image captured by the image sensor 801. The recording section 806 records moving images or still images captured by the image sensor 801 in a recording medium such as a hard disk, a semiconductor memory, or the like.

The operating section 807 is operated by the user to issue operation commands about various functions that the imaging device 800 has. The power supply section 808 supplies the DSP circuit 803, the frame memory 804, the display section 805, the recording section 806, and the operating section 807 with various types of electric power for operating these sections.

As described above, by using the solid-state image device described above as the image sensor 801, it is possible to obtain images of high image quality with reduced power supply noise while minimizing increases in consumed electric power and circuit scale.

<10. Examples in which a Solid-state Imaging Device is Used>

FIG. 15 is a diagram depicting examples in which the above solid-stage imaging device is used.

The above solid-stage imaging device can be used in various cases for sensing light such as visible light, infrared light, ultraviolet light, or X-rays, etc., for example, as described below.

- Devices for capturing images to be used as objects to be appreciated, such as digital cameras and mobile devices with a camera function, etc.
- Devices used in traffic, such as vehicle-mounted sensors for imaging areas in front of, behind, around, and within automobiles for performing safety driving modes such as an automatic stop, etc. and recognizing states of the driver, etc., monitoring cameras for monitoring traveling vehicles and roads, range-finding sensors for measuring the distances between vehicles, etc.
- Devices used on home electronic appliances such as TV sets, refrigerators, air conditioners, etc. for imaging gestures of the user and operating the appliances according to the gestures.
- Devices used for medical care and health care, such as endoscopes and devices for imaging blood vessels by detecting infrared radiation.
- Devices used for security purposes, such as monitoring cameras for crime prevention and cameras for personal authentication, etc.
- Devices used for beauty treatment, such as skin measuring instruments for imaging skins and microscopes for imaging scalps, etc.
- Devices used for sports, such as action cameras and wearable cameras, etc. in sports use.
- Devices used for agriculture, such as cameras for monitoring states of farms and crops, etc.

The embodiments of the present technology are not limited to the embodiments described above, but various changes and modifications may be made without departing from the scope of the present technology.

For example, the present technology is not limited to application to solid-state imaging devices for detecting a distribution of incident amounts of visible light and capturing the detected distribution as an image, but is also applicable to solid-state imaging devices for capturing images representing distributions of incident amounts of infrared radiation, X rays, and particles, etc., and a general range of solid-state imaging devices in a wider sense (physical quantity distribution detecting devices), such as fingerprint detecting sensors, etc., for detecting distributions of other physical quantities such as pressures and static capacitances, etc. to capture the image.

For example, combinations of all or part of the embodiments described above may be employed.

Note that the advantages described in the present description are given by way of illustrative example only, but are not restrictive, and other advantages that those described in the present description are also applicable.

The present technology may be arranged as follows:

(1) A solid-state imaging device including:
a pixel section including a plurality of unit pixels disposed for photoelectric transduction;
a power supply noise detector detecting a noise component from a power supply used to energize the unit pixels and outputting a single-ended canceling signal including a canceling component for canceling the noise component;
a sample and hold section configured to sample single-ended pixel signals output from the unit pixels and holding and outputting pixel signals representing the sampled pixel signals from which the noise component has been removed on the basis of the canceling signal; and
an A/D converter performing A/D (Analog/Digital) conversion on the pixel signals that have been held.

(2) The solid-state imaging device according to the above (1), in which the power supply noise detector includes
a first electric charge storage section configured to store an electric charge based on the pixel signals, and
a second electric charge storage section configured to store an electric charge based on the canceling signal, the second electric charge storage section having a reference potential shared with the first electric charge storage section.

(3) The solid-state imaging device according to the above (2), in which the second electric charge storage section stores a canceling electric charge which is essentially in the same quantity as a noise electric charge stored in the first electric charge storage section by the noise component of the pixel signal, by way of the canceling component of the canceling signal during a sampling period of the pixel signal.

(4) The solid-state imaging device according to the above (3), in which, during a holding period of the pixel signal, the sample and hold section cancels out the noise electric charge stored in the first electric charge storage section during the sampling period and the canceling electric charge stored in the second electric charge storage section during the sampling period.

(5) The solid-state imaging device according to any one of the above (2) through (4), in which the canceling component is a component representing the noise component amplified by a predetermined gain, and
the capacity of the second electric charge storage section is smaller than the capacity of the first electric charge storage section by a degree corresponding to the pre-determined gain.

(6) The solid-state imaging device according to the above (5), in which the phase of the canceling component is a phase inverted from the phase of the noise component.

(7) The solid-state imaging device according to the above (6), in which the power supply noise detector includes an adjusting mechanism adjusting the gain and the phase of the canceling component.

(8) The solid-state imaging device according to any one of the above (2) through (7), in which an end of the second electric charge storage section which is different from the end thereof that is set to the reference potential is connected to the output of the power supply noise detector through a first switch which is turned on during a sampling period of the pixel signal, and connected to an end of the first electric charge storage section which is different from the end thereof that is set to the reference potential through a second switch which is turned on during a holding period of the pixel signal.

(9) The solid-state imaging device according to any one of the above (2) through (7), in which the power supply noise detector includes
a first output outputting the canceling signal, and
a second output outputting a single-ended reference signal representing a bias voltage of the canceling signal, and
an end of the second electric charge storage section which is different from the end thereof that is set to the reference potential is connected to the first output through a first switch which is turned on during a sampling period of the pixel signal, and connected to the second output through a second switch which is turned on during a holding period of the pixel signal.

(10) A method of driving a solid-state imaging device, including:
a power supply noise detecting step of detecting a noise component from a power supply used to energize a plurality of unit pixels disposed for photoelectric transduction, and outputting a single-ended canceling signal including a canceling component for canceling the noise component;

a sample and hold step of sampling single-ended pixel signals output from the unit pixels and holding and outputting pixel signals representing the sampled pixel signals from which the noise component has been removed on the basis of the canceling signal; and an A/D converting step of performing A/D (Analog/Digital) conversion on the pixel signals that have been held.

(11) An electronic device including:

a solid-state imaging device including a pixel section including a plurality of unit pixels disposed for photoelectric transduction, a power supply noise detector detecting a noise component from a power supply used to energize the unit pixels and outputting a single-ended canceling signal including a canceling component for canceling the noise component, a sample and hold section configured to sample single-ended pixel signals output from the unit pixels and hold and output pixel signals representing the sampled pixel signals from which the noise component has been removed on the basis of the canceling signal, and an A/D converter performing A/D (Analog/Digital) conversion on the pixel signals that have been held.

REFERENCE SIGNS LIST

10 CMOS image sensor, 11 Pixel section, 12 Timing control circuit, 13 Vertical scanning circuit, 14 Power supply noise detector, 15 Sample and hold section, 16 A/D converter, 17 Horizontal scanning circuit, 18 Pixel drive line, 19 Vertical signal line, 31 Power supply noise canceler, 51 Unit pixel, 71 Sample and hold circuit, 101 through 105 Switch, 106 through 112 Transistor, 151 Power supply noise detecting circuit, 201 Switch, 801 Image sensor, Cvsl, Cpsr Sampling capacitance, Cadv, Cdly Variable capacitor, Cdiv Variable capacitance array, Ccpl, Cbias Capacitor, Rdet1, Rdet2, Rdif Variable resistor, mp1 through mpg, mn1 through mn5 Transistor

The invention claimed is:

1. A solid-state imaging device comprising:
a pixel section including a plurality of unit pixels disposed for photoelectric transduction;
a power supply noise detector that detects a noise component from a power supply used to energize said unit pixels and outputs a single-ended canceling signal including a canceling component for canceling said noise component;
a sample and hold circuit that samples single-ended pixel signals output from said unit pixels and hold and output holds and outputs pixel signals representing the sampled pixel signals from which said noise component has been removed based on the canceling signal; and
an A/D converter that performs A/D (Analog/Digital) conversion on the pixel signals that have been held,
wherein said power supply noise detector includes
a first electric charge storage section configured to store an electric charge based on the pixel signals, and
a second electric charge storage section configured to store an electric charge based on said canceling signal, said second electric charge storage section having a reference potential shared with said first electric charge storage section.

2. The solid-state imaging device according to claim 1, wherein said second electric charge storage section stores a canceling electric charge of substantially a same quantity as a noise electric charge stored in said first electric charge storage section by said noise component of the pixel signal, by way of said canceling component of said canceling signal during a sampling period of said pixel signal.

3. The solid-state imaging device according to claim 2, wherein, during a holding period of said pixel signal, said sample and hold section cancels out said noise electric charge stored in said first electric charge storage section during said sampling period and said canceling electric charge stored in said second electric charge storage section during said sampling period.

4. The solid-state imaging device according to claim 1, wherein
said canceling component is a component representing said noise component amplified by a predetermined gain, and
the capacity of said second electric charge storage section is smaller than the capacity of said first electric charge storage section by a degree corresponding to said pre-determined gain.

5. The solid-state imaging device according to claim 4, wherein the phase of said canceling component is a phase inverted from the phase of said noise component.

6. The solid-state imaging device according to claim 5, wherein said power supply noise detector includes an adjusting mechanism adjusting said gain and the phase of said canceling component.

7. The solid-state imaging device according to claim 1, wherein an end of said second electric charge storage section, which is different from the end thereof that is set to said reference potential, is connected to the output of said power supply noise detector through a first switch, which is turned on during a sampling period of said pixel signal, and is connected to an end of said first electric charge storage section, which is different from the end thereof that is set to said reference potential through a second switch, which is turned on during a holding period of said pixel signal.

8. The solid-state imaging device according to claim 1, wherein
said power supply noise detector includes
a first output outputting said canceling signal, and
a second output outputting a single-ended reference signal representing a bias voltage of said canceling signal, and
an end of said second electric charge storage section, which is different from the end thereof that is set to said reference potential, is connected to said first output through a first switch, which is turned on during a sampling period of said pixel signal, and is connected to said second output through a second switch is, which is turned on during a holding period of said pixel signal.

9. A method of driving a solid-state imaging device, comprising:
detecting a noise component from a power supply used to energize a plurality of unit pixels disposed for photoelectric transduction, and outputting a single-ended canceling signal including a canceling component for canceling said noise component;
sampling single-ended pixel signals output from said unit pixels and holding and outputting pixel signals representing the sampled pixel signals from which said noise component has been removed based on the canceling signal; and performing A/D (Analog/Digital) conversion on the pixel signals that have been held, wherein said detecting includes:
- storing an electric charge based on the pixel signals in a first electric charge storage section, and
- storing an electric charge based on said canceling signal in a second electric charge storage section, said second electric charge storage section having a reference potential shared with said first electric charge storage section.

10. An electronic device comprising:

a solid-state imaging device including
- a pixel section including a plurality of unit pixels disposed for photoelectric transduction,
- a power supply noise detector that detects a noise component from a power supply used to energize said unit pixels and outputs a single-ended canceling signal including a canceling component for canceling said noise component,
- a sample and hold circuit that samples single-ended pixel signals output from said unit pixels and holds and outputs pixel signals representing the sampled pixel signals from which said noise component has been removed based on the canceling signal, and
- an A/D converter that performs A/D (Analog/Digital) conversion on the pixel signals that have been held, wherein said power supply noise detector includes
- a first electric charge storage section configured to store an electric charge based on the pixel signals, and
- a second electric charge storage section configured to store an electric charge based on said canceling signal, said second electric charge storage section having a reference potential shared with said first electric charge storage section.

* * * * *